(12) United States Patent
Nakahiro et al.

(10) Patent No.: US 9,617,407 B2
(45) Date of Patent: Apr. 11, 2017

(54) HIGHLY INSULATING FILM

(75) Inventors: Takashi Nakahiro, Gifu (JP); Dai Nakagawa, Gifu (JP); Tetsuo Yoshida, Gifu (JP); Masanori Nishiyama, Gifu (JP)

(73) Assignee: TEIJIN LIMITED, Osaka (JP)

( * ) Notice: Subject to any disclaimer, the term of this patent is extended or adjusted under 35 U.S.C. 154(b) by 98 days.

(21) Appl. No.: 14/113,485

(22) PCT Filed: Apr. 25, 2012

(86) PCT No.: PCT/JP2012/061065
§ 371 (c)(1),
(2), (4) Date: Oct. 23, 2013

(87) PCT Pub. No.: WO2012/147777
PCT Pub. Date: Nov. 1, 2012

(65) Prior Publication Data
US 2014/0050913 A1    Feb. 20, 2014

(30) Foreign Application Priority Data

Apr. 26, 2011 (JP) ................................. 2011-098516
May 26, 2011 (JP) ................................. 2011-118085

(51) Int. Cl.
| C08L 25/06 | (2006.01) |
| C08J 5/18 | (2006.01) |
| B29C 37/00 | (2006.01) |
| B29C 55/02 | (2006.01) |
| B29C 55/14 | (2006.01) |
| H01B 17/56 | (2006.01) |
| B29K 25/00 | (2006.01) |
| B29K 71/00 | (2006.01) |

(52) U.S. Cl.
CPC .......... C08L 25/06 (2013.01); B29C 37/0025 (2013.01); B29C 55/026 (2013.01); B29C 55/143 (2013.01); C08J 5/18 (2013.01); B29K 2025/04 (2013.01); B29K 2071/12 (2013.01); C08J 2325/04 (2013.01); C08J 2471/12 (2013.01); H01B 17/56 (2013.01); Y10T 428/265 (2015.01); Y10T 428/31663 (2015.04); Y10T 428/31801 (2015.04); Y10T 428/31938 (2015.04)

(58) Field of Classification Search
CPC ....... H01L 2924/00; H01L 2924/01013; H01L 2924/010182; H01L 2224/48472; H01L 2224/45124; H01L 2224/48091; H01L 2224/48247; H01L 2224/49175; H01L 2224/00014; H01L 2224/85205; H01L 2224/05553; B29C 55/026; B29C 55/143
USPC ..... 428/220, 336, 447, 484.1, 523; 524/508; 525/132
See application file for complete search history.

(56) References Cited

U.S. PATENT DOCUMENTS

| 4,427,803 | A | * | 1/1984 | Fukui et al. ................... 523/402 |
| 4,680,353 | A | | 7/1987 | Ishihara et al. |
| 4,997,898 | A | | 3/1991 | Ishihara et al. |
| 5,093,758 | A | | 3/1992 | Funaki et al. |
| 5,166,238 | A | | 11/1992 | Nakano et al. |
| 5,707,719 | A | | 1/1998 | Yoshinaga et al. |
| 5,891,951 | A | | 4/1999 | Nakano et al. |
| 7,544,414 | B2 | * | 6/2009 | Tsutsumi et al. ............. 428/343 |
| 2004/0116583 | A1 | * | 6/2004 | Okada et al. ................. 524/474 |
| 2010/0178483 | A1 | | 7/2010 | Masuda et al. |

FOREIGN PATENT DOCUMENTS

| EP | 0318833 A2 | 6/1989 |
| EP | 0356857 A2 | 3/1990 |
| EP | 2163573 A1 * | 3/2010 |
| JP | 62-187708 A | 8/1987 |
| JP | 1-146912 A | 6/1989 |
| JP | 1-178505 A | 7/1989 |
| JP | 1-182346 A | 7/1989 |
| JP | 1-316246 A | 12/1989 |
| JP | 3-124750 A | 5/1991 |
| JP | 6-80793 A | 3/1994 |
| JP | 8-283496 A | 10/1996 |
| JP | 9-19959 A | 1/1997 |
| JP | 9-24543 A | 1/1997 |

(Continued)

OTHER PUBLICATIONS

Communication dated Mar. 10, 2015 from the European Patent Office in counterpart application No. 12776849.7.
Communication dated Feb. 24, 2015 from the European Patent Office in counterpart application No. 12776849.7.
S. Duff et al: "The crystallisation of blends of syndiotactic polystyrene and polyphenylene ether", Polymer, vol. 42, 2001, pp. 991-1000.

Primary Examiner — Aaron Austin
Assistant Examiner — Alicia Sawdon
(74) Attorney, Agent, or Firm — Sughrue Mion, PLLC

(57) ABSTRACT

This invention is a highly insulating film, which is characterized by including a biaxially stretched film containing a styrene polymer having a syndiotactic structure as a main component, containing a thermoplastic amorphous resin Y having a glass transition temperature Tg by DSC of 130° C. or higher in an amount of 5% by mass or more and 48% by mass or less, and having a plane orientation coefficient (AP) represented by the following equation (1) of −0.027 or less: $\Delta P = (N_x + N_y)/2 - N_z$ (1). In equation (1), $N_x$ represents the minimum value of the refractive index in the plane direction of the film, $N_y$ represents the refractive index in the direction perpendicular to $N_x$ in the plane direction of the film, and $N_z$ represents the refractive index in the thickness direction of the film.

9 Claims, 1 Drawing Sheet

(56) References Cited

FOREIGN PATENT DOCUMENTS

| | | |
|---|---:|---:|
| JP | 9-77935 A | 3/1997 |
| JP | 2009-235321 A | 10/2009 |
| JP | 7-156263 A | 6/2015 |
| WO | 2008/156210 A1 | 12/2008 |
| WO | 2011/065585 A1 | 6/2011 |

* cited by examiner

HIGHLY INSULATING FILM

CROSS REFERENCE TO RELATED APPLICATIONS

This application is a National Stage of International Application No. PCT/JP2012/061065, filed on Apr. 25, 2012 (which claims priority from Japanese Patent Application No. 2011-098516, filed on Apr. 26, 2011, and Japanese Patent Application No. 2011-118085, filed on May 26, 2011), the contents of which are incorporated herein by reference in their entirety.

TECHNICAL FIELD

This invention relates to a highly insulating film.

BACKGROUND ART

Films made of a syndiotactic polystyrene resin composition are films excellent in the heat resistance, chemical resistance, hot water resistance, dielectric characteristics, electrical insulation property and the like. Thus, syndiotactic polystyrene films are expected to be used in various applications. In particular, since the films are excellent in the dielectric characteristics and have high electrical insulation property and heat resistance, they are expected to be used as insulators for capacitors (Patent Documents 1 and 2). In addition, the films have been further improved, and for example, Patent Document 3 discloses a technique for increasing the withstand voltage by preventing impurities in a film. Patent Document 4 discloses a technique for improving the handling property and wear resistance by adjusting the added particles and the like. Patent Documents 5 and 6 disclose a technique for reducing the thickness variation by adjusting the refractive index of a film. Further, in these Patent Documents 3 to 6, the techniques are all disclosed as techniques regarding syndiotactic polystyrene films used for capacitor applications. In addition, Patent Document 7 discloses a technique for increasing the breakdown voltage by adding an antioxidant.

The syndiotactic polystyrene films disclosed in Patent Documents 1 to 6 are used as insulators for capacitors. However, for higher performance capacitors, such as capacitors installed in the recent hybrid cars, for example, films that are more excellent in the electrical characteristics such as the breakdown voltage and the heat resistance are required, and the properties are sometimes not sufficient. In addition, although the syndiotactic polystyrene film disclosed in Patent Document 7 is suitably used for a capacitor for a hybrid car and the like, further improvement of the heat resistance and the breakdown voltage is required.

Patent Document 1: JP-A-1-182346 publication
Patent Document 2: JP-A-1-316246 publication
Patent Document 3: JP-A-3-124750 publication
Patent Document 4: JP-A-6-80793 publication
Patent Document 5: JP-A-7-156263 publication
Patent Document 6: JP-A-8-283496 publication
Patent Document 7: JP-A-2009-235321 publication

DISCLOSURE OF THE INVENTION

Problems that the Invention is to Solve

In view of the above background, this invention aims to provide a highly insulating film, which is excellent in the heat resistance and has increased breakdown voltage.

Further, for the purpose of increasing the capacitance of a capacitor or reducing the size of a capacitor, a film serving as an insulator is required to have a smaller thickness; however, in general, the handling property deteriorates when the film becomes thinner. Thus, it is required to provide a film more excellent in the handling property, which does not deteriorate the productivity in the film production process and which can adapt to the recently-required production rate of capacitors even when the thickness is reduced.

Thus, desirable objects of this invention are to obtain a highly insulating film having further improved electrical characteristics, to obtain a highly insulating film having heat resistance and excellent electrical characteristics even at a high temperature, and to obtain a highly insulating film excellent in the handling property such as the windability and the processability.

Means for Solving the Problems

The present inventors conducted extensive research to solve the above problems, as a result found that the heat resistance and the breakdown voltage are improved, by making a syndiotactic polystyrene biaxially stretched film to have a specific orientation structure, and further adding a thermoplastic amorphous resin having a high glass transition temperature Tg by DSC, and thereby accomplished this invention.

That is, this invention adopts the following structure 1.

Structure 1. A highly insulating film, which comprises a biaxially stretched film containing a styrene polymer having a syndiotactic structure as a main component, contains a thermoplastic amorphous resin Y having a glass transition temperature Tg by DSC of 130° C. or higher in an amount of 5% by mass or more and 48% by mass or less, and has a plane orientation coefficient ($\Delta P$) represented by the following equation (1) of $-0.027$ or less, $$\Delta P = (Nx + Ny)/2 - Nz \quad (1)$$

(here, in the equation (1), Nx represents the minimum value of the refractive index in the plane direction of the film, Ny represents the refractive index in the direction perpendicular to Nx in the plane direction of the film, and Nz represents the refractive index in the thickness direction of the film), is provided.

Further, this invention includes the following structures 2 to 12 as the preferable embodiments.

Structure 2. The highly insulating film described in the above structure 1, in which the polymer Y is polyphenylene ether represented by the following formula (A).

[Chem. 1]

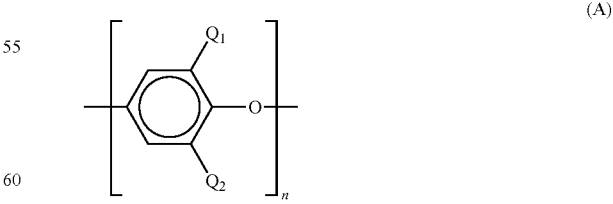

(A)

(Each of $Q_1$ and $Q_2$ in the above formula (A) is at least one kind selected from the group consisting of methyl, ethyl and propyl.)

Structure 3. The highly insulating film described in the above structure 1 or 2, which contains an antioxidant in an amount of 0.1% by mass or more and 8% by mass or less relative to the mass of the biaxially stretched film.

Structure 4. The highly insulating film described in the above structure 3 in which the content ratio of the polymer Y and the antioxidant (the polymer Y content/the antioxidant content) is 1 to 100.

Structure 5. The highly insulating film described in the above structure 3 or 4 in which the thermal decomposition temperature of the antioxidant is 250° C. or higher.

Structure 6. The highly insulating film described in any one of the above structures 1 to 5 in which the absolute value of the difference between the minimum value of the refractive index in the plane direction of the film (Nx) and the refractive index in the direction perpendicular to the direction (Nx) is 0.025 or less.

Structure 7. The highly insulating film described in any one of the above structures 1 to 6 in which the biaxially stretched film contains an inert fine particle having an average particle diameter of 0.05 μm or more and 3.0 μm or less in an amount of 0.05% by mass or more and 3% by mass or less relative to the mass of the biaxially stretched film.

Structure 8. The highly insulating film described in any one of the above structures 1 to 7 in which the biaxially stretched film has a coating layer, which is provided on at least one side of the biaxially stretched film and has a water contact angle of the surface of 85° or more and 120° or less.

Structure 9. The highly insulating film described in the above structure 8 in which the coating layer contains at least one kind selected from the group consisting of a wax component, a silicone component and a fluorine compound in an amount of 41% by mass or more and 94% by mass or less based on the mass of the coating layer.

Structure 10. The highly insulating film described in the above structure 9 in which the coating layer contains a wax component, and the wax component is polyolefin wax.

Structure 11. The highly insulating film described in any one of the above structures 8 to 10 in which the thickness of the coating layer is within the range of 0.005 to 0.5

Structure 12. The highly insulating film described in any one of the above structures 1 to 11 in which the thickness of the highly insulating film is 0.4 μm or more and less than 6.5 μm.

Effects of the Invention

According to this invention, a highly insulating film, which is excellent in the heat resistance and has increased breakdown voltage, can be provided.

Further, according to preferable embodiments of this invention, a highly insulating film excellent in the electrical characteristics, heat resistance and handling property can be provided. In particular, a highly insulating film having high breakdown voltage can be obtained. Thus, the highly insulating film obtained by this invention can be suitably used as an insulator for a capacitor.

BEST MODES FOR CARRYING OUT THE INVENTION

Figure 1A:
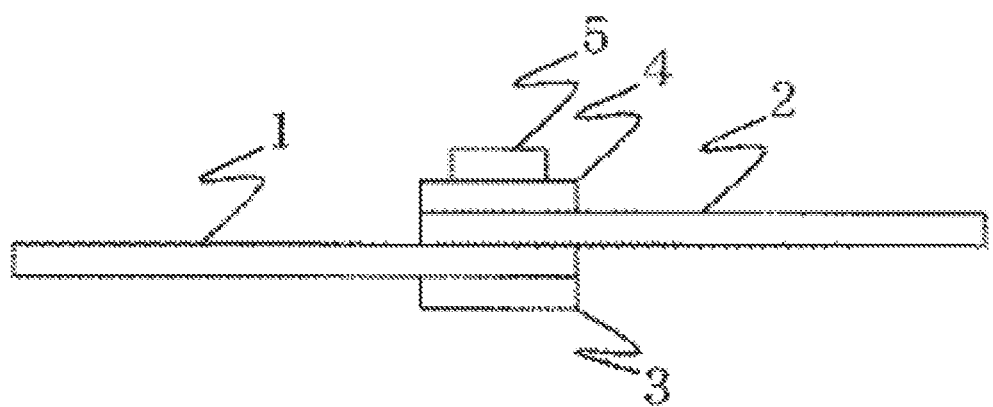
FIG. 1A shows a view from the horizontal direction of a sample and a device for measuring shearing force.

The highly insulating film of this invention is a biaxially stretched film containing a styrene polymer described below as a main component. Further, the highly insulating film of this invention contains a polymer Y having a glass transition temperature Tg by DSC of 130° C. or higher, and has a specific orientation structure. Furthermore, the highly insulating film of this invention preferably has a coating layer, which is provided on at least one side of the film and has a water contact angle of the surface of 85° or more and 120° or less. Here, the "main" represents exceeding 50% by mass, preferably 55% by mass or more, more preferably 60% by mass or more and particularly preferably 65% by mass or more, based on the mass of the biaxially stretched film. When the proportion of the styrene polymer described below is less than the lower limit, the film formability such as stretching deteriorates. Further, the biaxially stretched film of this invention preferably contains inert fine particles and an antioxidant described below. Each component constituting the highly insulating film of this invention is described below.

Styrene Polymer

The styrene polymer in this invention is a styrene polymer having a syndiotactic structure, that is, a polymer having a stereochemical structure in which phenyl groups and substituted phenyl groups as the side chains are positioned alternately in the opposite directions, relative to the main chain formed by carbon-carbon bonds. In general, the tacticity is quantitatively determined by nuclear magnetic resonance by isotopic carbons ($^{13}$C-NMR method), and can be defined by the proportion of successive structural units, for example, as a dyad in the case of two units, a triad in the case of three units and a pentad in the case of five units. In this invention, the styrene polymer having a syndiotactic structure means polystyrenes, poly(alkylstyrene), poly(halogenated styrene), poly(alkoxystyrene) or poly(vinyl benzoate), a polymer in which a part of the benzene ring is hydrogenated or a mixture thereof, or a copolymer including a structural unit thereof, which has a syndiotacticity of 75% or more and preferably 85% or more in the case of a racemic dyad (r), or of 30% or more and preferably 50% or more in the case of a racemic pentad (rrrr). In this regard, the poly(alkylstyrene) is poly(methylstyrene), poly(ethylstyrene), poly(propylstyrene), poly(butylstyrene), poly(phenylstyrene), poly(vinylnaphthalene), poly(vinylstyrene), poly(acenaphthylene) or the like. Further, the poly(halogenated styrene) is poly(chlorostyrene), poly(bromostyrene), poly(fluorostyrene) or the like. Furthermore, the poly(alkoxystyrene) is poly(methoxystyrene), poly(ethoxystyrene) or the like. As the particularly preferable styrene polymers among them, polystyrene, poly(p-methylstyrene), poly(m-methylstyrene), poly(p-t-butylstyrene), poly(p-chlorostyrene), poly(m-chlorostyrene), poly(p-fluorostyrene), and a copolymer of styrene and p-methylstyrene are mentioned.

Further, when the styrene polymer contains a copolymer component and used as a copolymer, as the comonomer, olefin monomers such as ethylene, propylene, butene, hexene and octene, diene monomers such as butadiene and isoprene, cyclodiene monomers, and polar vinyl monomers such as ethyl methacrylate, maleic anhydride and acrylonitrile are mentioned, in addition to the monomers of the styrene polymer described above.

The weight-average molecular weight of the styrene polymer is preferably $1.0 \times 10^4$ or more and $3.0 \times 10^6$ or less, more preferably $5.0 \times 10^4$ or more and $1.5 \times 10^6$ or less and particularly preferably $1.1 \times 10^5$ or more and $8.0 \times 10^5$ or less. By adjusting the weight-average molecular weight to $1.0 \times 10^4$ or more, it is possible to obtain a film, which is excellent in the strength characteristics and elongation characteristics and has improved heat resistance. Further, when the weight-average molecular weight is $3.0 \times 10^6$ or less, the stretching tension falls in a preferable range, and the breakage and the like are less likely to occur during the film formation and the like.

A method for producing such a styrene polymer having a syndiotactic structure is disclosed, for example in JP-A-62-187708 publication. That is, the styrene polymer can be produced by polymerizing a styrene monomer (a monomer corresponding to the above styrene polymer) in an inert hydrocarbon solvent or in the absence of a solvent, using a titanium compound and a condensed product of water and an organoaluminum compound, in particular trialkylaluminum, as catalysts. Further, a production method for the poly (halogenated alkylstyrene) is disclosed in JP-A-1-146912 publication and the production method for the hydrogenated polymer is disclosed in JP-A-1-178505 publication.

An additive such as a known antistatic agent may be added to the styrene polymer having a syndiotactic structure in this invention in an appropriate amount, if necessary. The amount thereof is preferably 10 parts by mass or less relative to 100 parts by mass of the styrene polymer. When the amount exceeds 10 parts by mass, the breakage is likely to occur during the stretching, and the production stability becomes poor, which is not preferable.

Such a styrene polymer having a syndiotactic structure is remarkably excellent in the heat resistance in comparison with the conventional styrene polymers having an atactic structure.

Polymer Y

In the highly insulting film of this invention, the biaxially stretched film contains the following thermoplastic amorphous resin Y.

The thermoplastic amorphous resin Y in this invention is a polymer having a glass transition temperature Tg determined by DSC (differential scanning calorimeter) of 130° C. or higher. Further, the thermoplastic amorphous resin Y preferably has a Tg higher than the glass transition temperature of the styrene polymer described above. When such a thermoplastic amorphous resin Y is incorporated in the styrene polymer, the glass transition temperature Tg as a mixture increases, and further, the heat resistance improves and the breakdown voltage at a high temperature increases. Further, the thermal dimensional stability of the highly insulating film becomes excellent and the stretchability can be also improved. From such points, the glass transition temperature Tg of the thermoplastic amorphous resin Y is preferably 150° C. or higher, more preferably 180° C. or higher and particularly preferably 200° C. or higher. As the glass transition temperature Tg of the thermoplastic amorphous resin Y incorporated is higher, the effect to improve the above effects such as the thermal dimensional stability becomes larger. Taking the melt extrusion and the like into consideration, the substantial upper limit is preferably 350° C. and more preferably 300° C.

Preferable examples of the thermoplastic amorphous resin Y are aromatic polyethers such as polyphenylene ether represented by the following formula (A) and polyetherimide, polycarbonate, polyarylate, polysulfone, polyethersulfone and polyimide. Among them, the polyphenylene ether represented by the following formula (A) is particularly preferable, because it easily improves the stretchability, and improves not only the heat resistance and the dimensional stability but also the breakdown voltage, probably due to the synergy effect when it is combined with an antioxidant.

[Chem. 2]

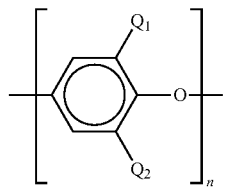

(A)

Preferable examples of each of Q1 and Q2 in the above formula (A) are groups such as methyl, ethyl and propyl. Further, specific examples of the polymer are poly-2,6-dimethyl-1,4-phenylene ether, poly-2,6-diethyl-1,4-phenylene ether and poly-2,6-dipropyl-1,4-phenylene ether. Among them, poly-2,6-dimethyl-1,4-phenylene ether, or poly-2,6-dimethyl-1,4-phenylene ether in which 2,3,6-trimethylphenylene ether unit is copolymerized is preferable. The method for producing the polyphenylene ether is not particularly limited, and the polyphenylene ether can be produced by the reaction of phenols, for example in accordance with the procedures described in U.S. Pat. No. 3,306,874 specification, U.S. Pat. No. 3,306,875 specification, U.S. Pat. No. 3,257,357 specification, U.S. Pat. No. 3,257,358 specification and the like.

In the highly insulating film of this invention, the biaxially stretched film is made of a resin composition in which the above thermoplastic amorphous resin Y is incorporated in an amount of 5% by mass or more and 48% by mass or less relative to the mass of the biaxially stretched film. By adding the thermoplastic amorphous resin Y in an amount within the above range, the heat resistance becomes excellent and the effect to increase the breakdown voltage can be improved. That is, the highly insulating film of this invention can increase the breakdown voltage at a high temperature. When the content is too low, the heat resistance tends to deteriorate, the effect to increase the breakdown voltage tends to deteriorate, and the effect to improve the stretchability also deteriorates. From such points, the content of the thermoplastic amorphous resin Y is more preferably 8% by mass or more, further more preferably 11% by mass or more and particularly preferably 20% by mass or more. In addition, when the content is too high, the crystallinity of the styrene polymer having a syndiotactic structure tends to deteriorate and the heat resistance of the film tends to deteriorate. From such points, the content of the thermoplastic amorphous resin Y is more preferably 45% by mass or less, further more preferably 40% by mass or less and particularly preferably 35% by mass or less.

Antioxidant

The highly insulating film of this invention preferably contains the following antioxidant.

The antioxidant in this invention may be a primary antioxidant that captures radicals produced to prevent the oxidation or a secondary antioxidant that decomposes a peroxide produced to prevent the oxidation. As the primary antioxidant, a phenolic antioxidant and an aminic antioxidant are mentioned; and as the secondary antioxidant, a phosphoric antioxidant and a sulfuric antioxidant are mentioned.

Specific examples of the phenolic antioxidant are monophenolic antioxidants such as 2,6-di-t-butyl-4-methylphenol, 2,6-di-t-butyl-4-ethylphenol, 2-t-butyl-4-methoxyphenol, 3-t-butyl-4-methoxyphenol, 2,6-di-t-butyl-4-[4,6-bis(octylthio)-1,3,5-triazin-2-ylamino]phenol and n-octadecyl- 3-(3,5-di-t-butyl-4-hydroxyphenyl)propionate. Further, bisphenolic antioxidants such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), N,N'-bis[3-(3,5-di-t-butyl-4-hydroxyphenyl)propionyl]hydrazine, N,N'-hexane-1,6-diylbis[3-(3,5-di-t-butyl-4-hydroxyphenyl) propionamide] and 3,9-bis[1,1-dimethyl-2-[β-(3-t-butyl-4-hydroxy-5-methylphenyl)propionyloxy]ethyl]-2,4,8,10-tetraoxaspiro[5.5]undecane are mentioned. Furthermore, polymeric phenolic antioxidants such as 1,1,3-tris(2-methyl-4-hydroxy-5-t-butylphenyl)butane, 1,3,5-trimethyl-2,4,6-tris (3,5-di-t-butyl-4-hydroxybenzyl)benzene, pentaerythritol tetrakis[3-(3,5-di-t-butyl-4-hydroxyphenyl)propionate], bis [3,3'-bis-(4'-hydroxy-3'-t-butylphenyl)butyric acid]glycol ester, 1,3,5-tris(3',5'-di-t-butyl-4'-hydroxybenzyl)-sec-triazine-2,4,6-(1H,3H,5H)trione and d-α-tocophenol are mentioned.

Specific examples of the aminic antioxidant are alkyl-substituted diphenylamine and the like.

Specific examples of the phosphoric antioxidant are triphenyl phosphite, diphenyl isodecyl phosphite, phenyl diisodecyl phosphite, 4,4'-butylidene-bis(3-methyl-6-t-butylphenylditridecyl)phosphite, octadecyl phosphite, tris (nonylphenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl)phosphite, cyclic neopentanetetraylbis(2,4-di-t-butylphenyl)phosphite, cyclic neopentanetetraylbis(2,6-di-t-butyl-4-methylphenyl)phosphite and 2,2'-methylenebis (4,6-di-t-butylphenyl)octylphosphite.

Specific examples of the sulfuric antioxidant are dilauryl-3,3'-thiodipropionate, dimyristyl-3,3'-thiodipropionate, distearyl-3,3'-thiodipropionate, pentaerythritol tetrakis(3-laurylthiopropionate) and 2-mercaptobenzimidazole.

From the viewpoints that the corrosion resistance becomes more excellent and the effect to increase the breakdown voltage can be further improved in particular, the antioxidant is preferably a primary antioxidant, and particularly preferably a phenolic antioxidant among them.

The thermal decomposition temperature of the antioxidant is preferably 250° C. or higher. When the thermal decomposition temperature is high, the effect to increase the breakdown voltage at a high temperature improves. When the thermal decomposition temperature is too low, the antioxidant itself is thermally decomposed during the melt extrusion, and problems, such as the contamination of the processes and the yellow-coloration of the polymer, tend to arise easily, which is not preferable. From such points, the thermal decomposition temperature of the antioxidant is more preferably 280° C. or higher, further more preferably 300° C. or higher and particularly preferably 320° C. or higher. It is preferable that the antioxidant in this invention is less likely to be thermally decomposed, and the thermal decomposition temperature is preferably high, but the upper limit thereof is practically about 500° C. or lower.

Further, the melting point of the antioxidant is preferably 90° C. or higher. When the melting point is too low, the antioxidant melts faster than the polymer during the melt extrusion and the polymer tends to slip at a screw feed part of the extruder. As a result, the polymer supply becomes unstable and problems such as the increased thickness variation of the film arise. From such points, the melting point of the antioxidant is more preferably 120° C. or higher, further more preferably 150° C. or higher and particularly preferably 200° C. or higher. On the other hand, when the melting point of the antioxidant is too high, the antioxidant is less likely to melt during the melt extrusion, and the dispersion in the polymer tends to deteriorate. As a result, problems, such as the local exhibition of the effect of the addition of the antioxidant, arise. From such points, the melting point of the antioxidant is preferably 300° C. or lower, more preferably 250° C. or lower, further more preferably 220° C. or lower and particularly preferably 170° C. or lower.

As such an antioxidant above, a commercially available product may be also used as it is. Preferred examples of the commercially available products are pentaerythritol tetrakis [3-(3,5-di-t-butyl-4-hydroxyphenyl)propionate] (manufactured by Ciba Specialty Chemicals Inc.: product name IRGANOX1010 (an antioxidant)), N,N'-bis[3-(3,5-di-t-butyl-4-hydroxyphenyl)propionyl]hydrazine (manufactured by Ciba Specialty Chemicals Inc.: product name IRGANOX1024 (an antioxidant)) and N,N'-hexane-1,6-diylbis[3-(3,5-di-t-butyl-4-hydroxyphenyl)propionamide] (manufactured by Ciba Specialty Chemicals Inc.: product name IRGANOX1098 (an antioxidant)).

The content of the antioxidant is preferably 0.1% by mass or more and 8% by mass or less based on the mass of the biaxially stretched film. By adding the antioxidant with the content in the above numerical range, the effect to increase the breakdown voltage can be improved. When the content of the antioxidant is too low, the effect of the addition of the antioxidant is not sufficient and the effect to increase the breakage voltage tends to deteriorate. From such points, the content of the antioxidant is more preferably 0.2% by mass or more, further more preferably 0.5% by mass or more and particularly preferably 1% by mass or more. On the other hand, when the content is too high, the antioxidant tends to aggregate in the biaxially stretched film, the number of defects due to the antioxidant tends to increase, and the effect to increase the breakage voltage deteriorates due to such defects. From such points, the content of the antioxidant is more preferably 7% by mass or less, further more preferably 5% by mass or less and particularly preferably 3% by mass or less.

One kind of the antioxidant may be used alone or two or more kinds thereof may be used in combination. When two or more kinds are used in combination, it may be an embodiment in which two or more kinds of primary antioxidants are used or an embodiment in which two or more kinds of secondary antioxidants are used, or one or more kinds of primary antioxidants and one or more kinds of secondary antioxidants may be used in combination. For example, by using two kinds of antioxidants of a primary antioxidant and a secondary antioxidant in combination, it is expected that both the primary oxidation and the secondary oxidation can be prevented. In this invention, an embodiment in which a primary antioxidant is used alone or an embodiment in which two or more kinds of primary antioxidants are used is preferable among them, in view of that the effect to increase the breakdown voltage can be further improved; and in particular, an embodiment in which a phenolic antioxidant is used alone or an embodiment in which two or more kinds of phenolic antioxidants are used is preferable.

The highly insulating film of this invention can achieve particularly excellent electrical characteristics (breakdown voltage) and heat resistance, by containing the thermoplastic amorphous resin Y and antioxidant described above in the biaxially stretched film respectively in the above described embodiments. That is, the highly insulating film of this invention can further increase the breakdown voltage at a high temperature.

Further, when the thermoplastic amorphous resin Y and the antioxidant are contained at the same time, the content ratio thereof (the thermoplastic amorphous resin Y content/ the antioxidant content) is preferably 1 to 100. When the content ratio is within the above numerical range, the breakdown voltage and the heat resistance are excellent in particular. The effects to further improve the electrical characteristics and the heat resistance tend to deteriorate, when the content ratio is too low or too high. From such points, the content ratio is more preferably 3 to 50 and particularly preferably 5 to 30.

Inert Fine Particles

Regarding the highly insulating film of this invention, the biaxially stretched film preferably contains an inert fine particle having an average particle diameter of 0.05 μm or more and 3.0 μm or less in an amount of 0.05 to 3% by mass based on the mass of the biaxially stretched film.

The specific inert fine particle is not particularly limited as long as it is stable relative to the syndiotactic polystyrene serving as the matrix resin in the biaxially stretched film, and those already known can be adopted. As the specific inert fine particles, polymer resin particles such as silicone resin particles, acrylic resin particles, styrene-acrylic resin particles, divinylbenzene-acrylic resin particles, polyester resin particles, polyimide resin particles and melamine resin particles: and inorganic fine particles such as (1) silicon dioxide (including hydrates, quartz sand, quartz and the like); (2) various crystal forms of alumina; (3) silicates containing 30% by mass or more of a $SiO_2$ component (for example, amorphous or crystalline clay minerals, aluminosilicates (including calcined products and hydrates), chrysotile, zircon and fly ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powder and glass beads); (13) carbonates of Ca and Mg; (14) fluorite; and (15) spinel-type oxides: are mentioned.

Preferable inert fine particles are explained below.

Inert Fine Particle A

In the highly insulating film of this invention, the biaxially stretched film preferably contains an inert fine particle A in which the average particle diameter and the relative standard deviation of the particle diameters are in specific numerical ranges.

The average particle diameter of the inert fine particle A is 0.05 μm or more and 1.5 μless. By adjusting the average particle diameter of the inert fine particle A within the above range, the air ventilation property of the film can be made excellent, a highly insulating film having excellent windability can be obtained and a film excellent in the processability can be obtained, while the breakdown voltage is kept high. When the average particle diameter of the inert fine particle A is too small, a sufficient air ventilation property tends to be difficult to obtain, the windability deteriorates and the processability also deteriorates. From such points, the average particle diameter of the inert fine particle A is preferably 0.1 μm or more, more preferably 0.15 μm or more and particularly preferably 0.2 μm or more. On the other hand, when the average particle diameter is too large, the size of the voids in the film tends to increase and the effect to increase the breakdown voltage deteriorates. From such points, the average particle diameter of the inert fine particle A is preferably 1.0 μm or less, more preferably 0.6 μm or less and particularly preferably 0.5 μm or less.

Further, regarding the inert fine particle A, the relative standard deviation of the particle diameters is 0.5 or less. By adjusting the relative standard deviation of the particle diameters in the above numerical range, the heights of the projections on the film surface become uniform and the windability further improves. Further, the numbers of coarse particles and coarse projections are reduced, and the effect to increase the breakdown voltage can be improved. From such points, the relative standard deviation of the particle diameters of the inert fine particle A is preferably 0.4 or less, more preferably 0.3 or less and particularly preferably 0.2 or less.

In addition, the inert fine particle A in this invention is preferably a spherical particle having a particle diameter ratio of 1.0 or more and 1.3 or less. The particle diameter ratio is more preferably 1.0 or more and 1.2 or less and particularly preferably 1.0 or more and 1.1 or less. When the particle diameter ratio falls within the above numerical range, the effect to improve the windability and the effect to increase the breakdown voltage can be further improved.

The content of the inert fine particle A is preferably 0.05% by mass or more and 2.0% by mass or less in 100% by mass of the biaxially stretched film. By adding the inert fine particle A in an amount of the above numerical range, the handling property of the film such as the windability can be made excellent and also the processability can be made excellent, while the breakdown voltage is kept high. When the content of the inert fine particle A is too low, the air ventilation property tends to deteriorate and the windability deteriorates. From such points, the content of the inert fine particle A is more preferably 0.1% by mass or more, further more preferably 0.15% by mass or more and particularly preferably 0.2% by mass or more. On the other hand, when the content is too high, the film surface tends to become too rough, the shaving resistance of the film surface tends to thus deteriorate and the effect to increase the breakdown voltage deteriorates. Further, in the application as a capacitor in particular, the space factor tends to increase. From such points, the content of the inert fine particle A is more preferably 1.0% by mass or less, further more preferably 0.5% by mass or less and particularly preferably 0.3% by mass or less.

The inert fine particle A may be an organic fine particle or an inorganic fine particle, and those exemplified above are preferable. Among the organic fine particles, silicone resin particles and polystyrene resin particles are particularly preferable, in view of the excellent slidability and shaving resistance. Such polymer resin particles are preferably spherical as described above, that is, spherical polymer resin particles are preferable. Among them, spherical silicone resin particles and spherical polystyrene resin particles are particularly preferable, in view of the excellent slidability and shaving resistance. Further, among the inorganic fine particles, calcium carbonate particles and silica particles are preferable, and silica particles are particularly preferable, in view of the excellent slidability and shaving resistance. Such inorganic fine particles are preferably spherical as described above, and spherical silica particles are particularly preferable, in view of the excellent slidability and shaving resistance.

As the inert fine particle A, spherical silicone resin particles are most preferable. When spherical silicone resin particles are used as the inert fine particle A, the heat resistance becomes especially high due to the synergy effect when polyphenylene ether is used as the polymer Y.

Inert Fine Particle B

In the highly insulating film of this invention, the biaxially stretched film preferably contains an inert fine particle B in which the average particle diameter and the relative standard deviation of the particle diameters are in specific numerical ranges, in addition to the above inert fine particle A.

The average particle diameter of the inert fine particle B is 0.5 μm or more and 3.0 μm or less. By adjusting the average particle diameter of the inert fine particle B within the above numerical range, appropriate slidability can be achieved and the effect to improve the windability can be improved, while the breakdown voltage is kept high. When the average particle diameter of the inert fine particle B is too small, the slidability tends to deteriorate and the effect to improve the windability deteriorates. From such points, the average particle diameter of the inert fine particle B is preferably 0.7 μm or more, more preferably 1.0 μm or more and particularly preferably 1.1 μm or more. On the other hand, when the average particle diameter is too large: the heights of the projections on the film surface tend to be too high; the slidability thus becomes too high; and the effect to improve the windability deteriorates, for example, the edge misalignment is more likely to arise during the winding. In addition, the shaving resistance tends to deteriorate, and the effect to increase the breakdown voltage deteriorates. From such points, the average particle diameter of the inert fine particle B is preferably 2.0 μm or less, more preferably 1.5 μm or less and particularly preferably 1.3 μm or less.

The average particle diameter of the inert fine particle B is preferably at least 0.2 μm larger than the average particle diameter of the inert fine particle A. Making the difference between the average particle diameter of the inert fine particle A and the average particle diameter of the inert fine particle B as in the above embodiment results in an embodiment in which high projections (projections which are relatively high) due to the inert fine particle B are dispersed on the film surface, and the air ventilation property between the films thus become further excellent. At the same time, it leads to an embodiment in which low projections due to the inert fine particle A exist, and the slidability between the films become further excellent. Accordingly, when the film is wound to form a roll, the balance between the air ventilation property and the slidability is excellent, and the effect to improve the windability can be improved, for example a film roll having an excellent wound configuration can be obtained even when the film is wound at a high speed. From such points, an embodiment in which the average particle diameter of the inert fine particle B is at least 0.4 μm larger than the average particle diameter of the inert fine particle A is preferable, and an embodiment in which the average particle diameter of the inert fine particle B is at least 0.6 μm larger is more preferable, and an embodiment in which the average particle diameter of the inert fine particle B is at least 0.8 μm larger is particularly preferable.

Further, the inert fine particle B has a relative standard deviation of the particle diameters of 0.5 or less, from the same viewpoints as in the inert fine particle A described above. The relative standard deviation of the particle diameters of the inert fine particle B is preferably 0.4 or less, more preferably 0.3 or less and particularly preferably 0.2 or less.

Furthermore, from the same viewpoints as in the inert fine particle A described above, the inert fine particle B is a spherical particle having a particle diameter ratio of preferably 1.0 or more and 1.3 or less, more preferably 1.0 or more and 1.2 or less and particularly preferably 1.0 or more and 1.1 or less.

The highly insulating film of this invention preferably contains 0.01% by mass or more and 1.5% by mass or less of the inert fine particle B above in 100% by mass of the biaxially stretched film. By adding the inert fine particle B in an amount of the above numerical range, the effect to improve the handling property of the film such as the windability can be improved, while the breakdown voltage is kept high. When the content of the inert fine particle B is too low, the slidability tends to deteriorate and the effect to improve the windability deteriorates. From such points, the content of the inert fine particle B is more preferably 0.05% by mass or more, further more preferably 0.1% by mass or more and particularly preferably 0.2% by mass or more. On the other hand, when the content is too high, the frequency of voids in the film tends to increase and the effect to increase the breakdown voltage deteriorates. In addition, the slidability tends to become too high, and the effect to improve the windability deteriorates, for example the edge misalignment during the winding is more likely to arise. From such points, the content of the inert fine particle B is more preferably 1.0% by mass or less, further more preferably 0.5% by mass or less and particularly preferably 0.4% by mass or less.

As the inert fine particle B, the organic fine particles and the inorganic fine particles, which are similar to those of the inert fine particle A described above, can be used. Among them, the organic fine particles are preferable, and spherical silicone resin particles and spherical polystyrene resin particles are preferable, and spherical silicone resin particles are particularly preferable, in view of the excellent slidability and shaving resistance. Such organic fine particles are preferably spherical as described above, and spherical silicone resin particles are particularly preferable, in view of the excellent slidability and shaving resistance. When spherical silicone resin particles are used as the inert fine particle B, the heat resistance becomes especially high due to the synergy effect when polyphenylene ether is used as the polymer Y.

The method for adding the inert fine particle A and the inert fine particle B used in this invention is not limited, as long as the fine particles are contained in the final biaxially stretched film. An example thereof is a method to add them at an optional process of the melt extrusion. Further, in order to effectively disperse these fine particles, a dispersant, a surfactant and the like can be used.

In this invention, when both the inert fine particle A and the inert fine particle B are used, an embodiment in which spherical silicone resin particles are used as the both inert fine particles is preferably exemplified: in such a case however, since the average particle diameters of both particles are different and the relative standard deviations of the particle diameters in both particles are small, the two kinds of the particles show two particle diameter peaks, which can be clearly distinguished, on the particle diameter frequency curve, that is, the inert fine particle A and the inert fine particle B can be clearly distinguished. In this regard, when the two particle diameter peaks overlap each other at the base parts thereof to form a valley part, it is divided into the two particle diameter peaks with the point showing the minimum value in the valley part as the boundary.

Inert Fine Particle C

As described above, it is preferable that the highly insulating film of this invention contains the inert fine particle A, and more preferably the inert fine particles A and B. On the other hand, in view of avoiding voids, it is also preferable to contain an inert fine particle C, which is an aggregate of primary particles and has an average particle diameter of 0.05 µm or more and 3 µm or less and a pore volume of 0.05 to 2.0 ml/g, instead of the inert fine particles A and B. Of course, it can be used in combination with the inert fine particles A and B. The average particle diameter of the primary particles of the inert fine particle C is preferably in the range of 0.01 to 0.1 µm. When the average particle diameter of the primary particles is less than 0.01 µm, extremely fine particles are produced due to the pulverization at the slurry stage, and they form an aggregate, which is not preferable. Further, when the average particle diameter of the primary particles exceeds the upper limit, the porosity of the particles is lost, as a result the affinity to polyester is lost, and voids are more likely to be formed. Further, the pore volume is preferably within the range of 0.05 to 2.0 ml/g and more preferably 0.6 to 1.8 ml/g. When the pore volume is less than the lower limit, the porosity of the particles is lost, which is not preferable. On the other hand, when the pore volume is more than the upper limit, the pulverization and aggregation are likely to occur, and it becomes difficult to adjust the particle diameters. The average particle diameter (secondary particle diameter) of the inert fine particle C used in this invention is preferably within the range of 0.05 µm or more and 3 µm or less, more preferably 0.7 to 2.7 µm and particularly preferably 1.0 to 2.5 µm. When the average particle diameter (secondary particle diameter) is less than the lower limit, the slidability of the film is more likely to be insufficient; while the film surface becomes too rough, and the electrical characteristics as a capacitor are likely to deteriorate when the average particle diameter (secondary particle diameter) exceeds the upper limit. The content of the inert fine particle C is 0.05 to 3% by weight and preferably 0.1 to 1% by weight based on the mass of the biaxially stretched film. When the amount is less than the lower limit, the slidability of the film is not sufficient. Further, when the amount exceeds the upper limit, the film surface becomes too rough and the electrical characteristics as a capacitor are likely to deteriorate. As the specific inert fine particle C, porous silica, alumina, titanium oxide and the like are exemplified, and porous silica is particularly preferable.

Other Additives

In the highly insulating film of this invention, it is preferable that the biaxially stretched film is made of the styrene polymer having a syndiotactic structure and the thermoplastic amorphous resin Y described above and contains the inert fine particles and the antioxidant; but it can further contain a resin component other than the thermoplastic amorphous resin Y in order to further improve the formability, dynamic physical properties, surface properties and the like.

Preferred examples of another resin component, which can be contained, are styrene polymers having an atactic structure, styrene polymers having an isotactic structure, and styrene-maleic anhydride copolymers; because they are compatible with the above styrene polymer having a syndiotactic structure and are effective in controlling the crystallization in producing a preliminary formed body for stretching, the following stretchability improves, the control of the stretching condition is easy, and a film excellent in the dynamic physical properties can be obtained. Among them, when a styrene polymer having an atactic structure and/or an isotactic structure is contained, a polymer consisting of the same monomers as in the styrene polymer having a syndiotactic structure is preferable. Further, the content ratio of such a compatible resin component may be preferably 40 parts by mass or less, more preferably 20 parts by mass or less and particularly preferably 10 parts by mass or less, relative to 100 parts by mass of the styrene polymer having a syndiotactic structure. When the content ratio of the compatible resin component exceeds 40 parts by mass, the effect to improve the heat resistance, which is the strong point of the styrene polymer having a syndiotactic structure, deteriorates.

Further, among the other resin components, which can be contained, the resin incompatible with the styrene polymer having a syndiotactic structure corresponds to the resins other than the above compatible resins, for example, polyolefins such as polyethylene, polypropylene, polybutene, and polypentene; polyesters such as polyethylene terephthalate, polybutylene terephthalate and polyethylene naphthalate; polyamides such as Nylon 6 and Nylon 6,6; polythioethers such as polyphenylene sulfide; polyacrylate; polysulfone; polyetheretherketone; polyethersulfone; polyimide; halogenated vinyl polymers such as TEFLON (registered trademark for a polytetrafluoroethylene); acrylic polymers such as polymethyl methacrylate; and polyvinyl alcohol, and a cross-linked resin including the above compatible resins are further mentioned. These resins are incompatible with the styrene polymer having a syndiotactic structure of this invention, and thus can be dispersed in island state in the styrene polymer having a syndiotactic structure when a small amount is contained, and they are effective to achieve moderate gloss after stretching and improve the slidability of the surface. The content ratio of the incompatible resin component is preferably 30 parts by mass or less, more preferably 20 parts by mass or less and particularly preferably 10 parts by mass or less, relative to 100 parts by mass of the styrene polymer having a syndiotactic structure. When the temperature at which the product is used is high, an incompatible resin component having a relatively high heat resistance is preferably contained.

Further, additives such as an antistatic agent, a coloring agent and a weathering agent may be added, as long as the objects of this invention are not impaired.

Coating Layer

The highly insulating film of this invention preferably has a coating layer having a water contact angle of the surface of 85° or more and 120° or less on at least one side thereof. By including such a coating layer, the breakdown voltage can be increased. The reason thereof is unclear, but it is thought that the concentration of the electric charge can be reduced and the breakdown voltage is increased, by the existence of the thin coating layer between the biaxially stretched film and the electrode. Further, when the coating layer, which is a thin layer having smaller surface energy than that of the biaxially stretched film, exists, it is thought that, even when the discharge occurs, the coating layer is peeled off from the biaxially stretched film, the biaxially stretched film as a dielectric body is prevented from breaking, and as a result the breakdown voltage increases. That is, in this invention, it is thought that, when the water contact angle of the coating layer surface is within the above numerical range, the coating layer peels off from the film with the discharge due to the impressed voltage, only the coating layer peeled breaks while the film does not break, and as a result the breakdown voltage increases.

Therefore, when the water contact angle of the coating layer is too small, the coating layer is unlikely to be peeled off from the film even with the discharge, the breakdown of the film occurs by being induced by the breakdown of the coating layer because the peeling is insufficient, and the effect to increase the breakdown voltage by the coating layer cannot be achieved. Further, when the water contact angle of the coating layer is in the above range, the slidability becomes excellent and the windability can be improved, and the heat resistance considered by the shearing stress and the like described above can be also improved.

From such points, the water contact angle of the coating layer surface is preferably 86° or more, more preferably 88° or more, further more preferably 90° or more and particularly preferably 95° or more. On the other hand, when the water contact angle is high, since the coating layer tends to be peeled off from the film easily, only the coating layer that is easily peeled off breaks even with the discharge, and the breakdown of the film becomes difficult. However, when the water contact angle of the coating layer surface becomes too high, the adhesiveness with the metal layer formed thereon to form a capacitor deteriorates; and in particular, when the water contact angle exceeds 120°, the adhesiveness with the metal layer deteriorates and the functions as a capacitor tends to be difficult to be achieved. From such points, the water contact angle of the coating layer surface is necessarily 120° or less, preferably 115° or less, more preferably 110° or less and further more preferably 105° or less.

In order to achieve the value of the surface water contact angle above, a component, which can reduce the surface energy of the coating layer after providing the coating layer, such as a wax component, a silicone component and a fluorine component, may be contained in the coating layer. Further, also by adjusting the content thereof or the thickness of the coating layer, the water contact angle of the coating layer surface can be adjusted. Preferably, it is an embodiment in which the component described below is contained in the amount described below. In this regard, among a wax component, a silicone component and a fluorine component, a wax component and a silicone component are particularly preferable.

The kind of the coating layer in this invention is not particularly limited, as long as the water contact angle of the surface described above can be achieved, but it is preferable to contain at least one kind selected from the group consisting of a wax component, a silicone component and a fluorine component, in an amount of 41% by mass or more and 94% by mass or less relative to the mass of the coating layer. Here, the content means the total content of the wax component, the silicone component and the fluorine component in the coating layer. By adding at least one kind of these components with the above content to the coating layer, it becomes easy to make the surface energy of the coating layer smaller than the surface energy of the film, and the above numerical range of the water contact angle of the coating layer surface can be achieved easily. When the content is too low, the water contact angle tends to be unlikely to be high. From such points, the content of the above component is further more preferably 51% by mass or more and particularly preferably 65% by mass or more. On the other hand, when the content is high, the contact angle tends to become high, which tends to be preferable in terms of the peeling of the coating layer; but when the content is too high, it becomes difficult to form a uniform coating layer, and the effect to increase the breakdown voltage deteriorates, because, for example, a defect of the coating layer such as lacking of coating is more likely to arise, or the coating layer is more likely to be peeled off from the film. Further, when a capacitor is produced, the metal layer is more likely to be peeled off because the mold-releasing property of the coating layer is too high, the metal layer is easily separated during the processing to a capacitor such as winding, and a defective product as a capacitor may be produced. From such points, the content is further more preferably 90% by mass or less and particularly preferably 85% by mass or less.

Wax Component

As the wax component, synthesized wax such as polyolefin wax and ester wax, and natural wax such as carnauba wax, candelilla wax and rice wax are mentioned. As the polyolefin wax, polyethylene wax, polypropylene wax and the like are mentioned. Further, examples of the ester wax are ester wax consisting of aliphatic monocarboxylic acid having 8 or more carbon atoms and polyalcohol, and specifically, sorbitan tristearate, pentaerythritol tribehenate, glycerin tripalmitate and polyoxyethylene distearate are exemplified. Among the wax, it is preferable to use the polyolefin wax because the contact angle defied in this invention is easily satisfied. In particular, polyethylene wax is preferable.

Further, in view of the excellent dispersibility in the coating layer and the high effect to increase the breakdown voltage therefrom, the wax is preferably water soluble or water dispersible.

Silicone Component

The silicone component is preferably a silicone composition which is mainly made of a silicone compound having a reactive group. Here, "mainly" means, for example, 70% by mass or more in the silicone component, preferably 80% by mass or more and more preferably 90% by mass or more. By such an embodiment, the effect to increase the breakdown voltage can be improved. A silicone compound having no reactive group may be contained in the silicone component, but, when the content thereof is too high (for example, 30% by mass or more in the silicone component), it is difficult to form a vapor-deposited layer, and evaluation as a capacitor cannot be made. Thus, the content of the silicone compound having no reactive group is preferably 20% by mass or less and more preferably 10% by mass or less in the silicone component.

As the above silicone compound, polydimethyl siloxane in which the methyl group may be substituted with another alkyl group, phenyl group or the like is preferably mentioned; and by using this, the effect to increase the breakdown voltage can be further improved. Further, as the reactive group that is preferably contained, a hydrogen group, a vinyl group (including vinyl alkyl groups such as aryl group), a hydroxyl group and the like are mentioned. That is, the silicone compound having a reactive group is particularly preferably polydimethyl siloxane having such a reactive group. In polydimethyl siloxane having such a reactive group, in general, two or more reactive groups are included in the molecule and are directly bonded to the silicon atom. Further, by the heat applied during the coating layer formation, or preferably by using a catalyst such as platinum and palladium, an addition reaction of the hydrogen group and the vinyl group occurs or a condensation reaction of the hydrogen group and the hydroxyl group occurs, a curing reaction occurs and a cross-linked structure is formed to form a silicone composition.

The silicone compound may be a mixture of silicone compounds having different reactive groups. The molecular weight of the silicone compound is preferably 1,000 to 500,000. When the molecular weight is less than 1,000, the coating coagulation force decreases and lacking of the coating layer sometimes occurs easily; and, when it exceeds 500,000, the viscosity becomes high and the handling is sometimes difficult.

In view of that the coating liquid for forming the coating layer is easy to handle, that an excellent dispersibility in the coating layer is shown and that the effect to increase the breakdown voltage is thus increased; the silicone compound, polydimethyl siloxane, is preferably water soluble or water dispersible.

Further, in this invention, the above silicone compound is preferably used in combination with a silane coupling agent. The silane coupling agent is a silane compound, which has a hydrolytic group directly bonded to the silicon atom, and preferably has a reactive group described below. As the silane compound having a reactive group, it is preferable to use those having a hydrolytic group directly bonded to the silicon atom and containing at least one reactive group selected from an organic group including an amino group, an organic group including an epoxy group and an organic group including a carboxylic acid group. The hydrolytic group is an organic group forming a silanol group by hydrolysis and reaction, such as an alkoxy group including methoxy group and ethoxy group, and a halogen group.

Regarding specific examples of the reactive group of the silane compound, examples of the organic group including an amino group are organic groups having a primary amino alkyl group such as 3-aminopropyl group, 3-amino-2-methyl-propyl group and 2-aminoethyl group, or primary and secondary amino groups such as N-(2-aminoethyl)-3-aminopropyl group and N-(2-aminoethyl)-2-aminoethyl group. Examples of the organic group including epoxy group are glycidoxyalkyl groups such as γ-glycidoxypropyl group, β-glycidoxyethyl group and γ-glycidoxy-β-methyl-propyl group, and glycidoxycarbonyl alkyl groups such as 2-glycidoxycarbonyl-ethyl group and 2-glycidoxycarbonyl-propyl group. Examples of the organic group forming a silanol group by hydrolysis are alkoxy groups such as methoxy group, ethoxy group, butoxy group and 2-ethylhexyloxy group; alkoxy-β-ethoxy groups such as β-methoxyethoxy group, β-ethoxyethoxy group and butoxy-β-ethoxy group; acyloxy groups such as acetoxy group and propoxy group; N-alkylamino groups such as methylamino group, ethylamino group and butylamino group; N,N-di-alkylamino groups such as dimethylamino group and diethylamino group; nitrogen-including heterocyclic groups such as imidazole group and pyrrol group.

The preferable silane coupling agents in this invention are those having three methoxy groups as the hydrolytic groups and γ-glycidoxypropyl group as the reactive group, and those having three ethoxy groups as the hydrolytic groups and γ-glycidoxypropyl group as the reactive group. By adding such a silane coupling agent, the crosslink density of the thin membrane of the silicone compound can be increased. When the coating membrane stiffness improves, the breakage of the film due to discharging can be further inhibited and the breakdown characteristics improve.

Fluorine Component

As the fluorine component, polymers using a fluoroethylene monomer, polymers using an alkyl fluoride (meth) acrylate monomer and the like are mentioned. As the (co) polymer using a fluoroethylene monomer, (co)polymers of tetrafluoroethylene, trifluoroethylene, difluoroethylene, monofluoroethylene, difluorodichloroethylene and the like are mentioned.

Other Additives in Coating Layer

The coating layer may further include a surfactant, a cross-linking agent, a lubricant and the like.

The surfactant is used in order to improve the wettability of the coating liquid for forming the coating layer or improve the stability of the coating liquid, and examples thereof are anionic and non-ionic surfactants such as polyoxyethylene-fatty acid ester, sorbitan fatty acid ester, glycerin fatty acid ester, fatty acid metal soap, alkyl sulfate, alkyl sulfonate and alkyl sulfosuccinate. The surfactant is preferably contained in an amount of 1 to 60% by mass based on the mass of the coating layer.

Further, by adding a cross-linking agent, the coagulation force of the coating layer can be improved, which is preferable. Examples of the cross-linking agent are an epoxy compound, an oxazoline compound, a melamine compound and an isocyanate compound, and other coupling agents can be also used. The amount of the cross-linking agent to be added is preferably 5 to 30% by mass based on the mass of the coating layer.

In addition, to the coating layer of this invention, a fine particle, which is inert to the components constituting the coating layer, can be added, in order to further improve the handling property of the highly insulating film obtained, or prevent the films from blocking. Such a fine particle is preferably an organic or inorganic inert fine particle, and examples thereof are calcium carbonate, calcium oxide, aluminum oxide, kaolin, silicon oxide, zinc oxide, silica particles, cross-linked acrylic resin particles, cross-linked polystyrene resin particles, melamine resin particles and cross-linked silicone resin particles.

The thickness of the coating layer is preferably 0.005 to 0.5 μm, more preferably 0.005 to 0.2 μm and further more preferably 0.02 to 0.1 μm as the thickness after drying. By adjusting the thickness of the coating layer in this range, the energy of larger voltage can be eliminated when the coating layer is peeled off and breaks, and the effect to increase the breakdown voltage can be improved. When the thickness of the coating layer is less than the lower limit, the effect to increase the breakdown voltage may not be achieved sufficiently. Further, even when the thickness of the coating layer is made larger than the upper limit, additional effect to increase the breakdown voltage may not be achieved.

Metal Layer

The highly insulating film of this invention forms a capacitor, for example by laminating a metal layer on at least one side thereof. The material of the metal layer is not particularly limited, and for example, aluminum, zinc, nickel, chromium, tin, copper and an alloy thereof are mentioned. Further, a small amount of the metal layer may be oxidized. Furthermore, the metal layer is preferably a vapor-deposited metal layer formed by vapor-deposition method, because the metal layer can be easily formed.

Further, in laminating the metal layer, by further providing a metal layer on the surface of the coating layer of this invention, the base material layer and the metal layer have an appropriate adhesiveness, the metal layer is not peeled off when a processing such as winding is conducted in the production of the film capacitor, and the functions as a capacitor can be achieved. Further, at the same time, the coating layer and the metal layer have an appropriate adhesiveness, the coating layer having smaller surface energy is peeled off first from the film even with discharging, only the metal layer and the coating layer break, the film does not break, the short circuit is therefore avoided, and the effect to increase the breakdown voltage can be improved.

Film Characteristics

The film characteristics of the highly insulating film of this invention are explained below.

Plane Orientation Coefficient (ΔP)

The highly insulating film of this invention has a plane orientation coefficient (ΔP) by the refractive index of the biaxially stretched film represented by the above equation (1) of −0.027 or less. In this regard, in the highly insulating film of this invention, as the plane orientation coefficient is a negative value and smaller, the molecular chains are oriented in the plane direction of the film; and surprisingly, the heat resistance considered by the shearing stress described below can be improved when the plane orientation coefficient (ΔP) is made the upper limit or less. From such points, the upper limit of the plane orientation coefficient is preferably −0.029 or less, more preferably −0.030 or less, further more preferably −0.032 or less and particularly preferably −0.033 or less.

On the other hand, the lower limit of the plane orientation coefficient (ΔP) is not particularly limited, but the frequency of the film breakage during the film production process, particularly during the stretching process, tends to increase and the productivity of the film is more likely to deteriorate. From such points, the lower limit of the plane orientation coefficient (ΔP) is preferably −0.045 or more, more preferably −0.040 or more, further more preferably −0.039 or more and particularly preferably −0.038 or more.

The above plane orientation coefficient can be achieved by adding the thermoplastic amorphous resin Y and adopting the production method described below. That is, the preferable plane orientation coefficient in this invention can be achieved: by controlling the draw ratio of the film in a specific numerical range described below; and by, in the stretching process, dividing the stretching temperature into several stages in stretching in the direction perpendicular to the first axial direction, which is conducted after stretching in the first axial direction, and differentiating the temperature of the first stage and the temperature of the final stage by specific degrees.

Refractive Index in Thickness Direction

The highly insulating film of this invention preferably has a refractive index in thickness direction of the biaxially stretched film of 1.580 or more and 1.635 or less. By controlling the refractive index in thickness direction in the above numerical range, the breakdown voltage can be further increased. Further, the frequency of the film breakage during the film production process decreases, and the productivity is more likely to improve. From such points, the refractive index in the thickness direction is preferably 1.620 or less, more preferably 1.615 or less and particularly preferably 1.610 or less. On the other hand, when the refractive index in the thickness direction is too small, the breakdown voltage tends to decrease.

In addition, with the highly insulating film of this invention, the frequency of the film breakage during the capacitor production process increases, and the productivity of the capacitor is likely to deteriorate. Further, the thickness variation of the film tends to increase and a capacitor having a stable quality is difficult to obtain. From such points, the refractive index in the thickness direction is preferably 1.590 or more, more preferably 1.595 or more and particularly preferably 1.600 or more.

The refractive index in the thickness direction above can be achieved by adding the thermoplastic amorphous resin Y and adopting the production method described below. That is, the preferable refractive index in the thickness direction in this invention can be achieved: by controlling the draw ratio of the film in a specific numerical range described below; and by, in the stretching process, dividing the stretching temperature into several stages in stretching in the direction perpendicular to the first axial direction, which is conducted after stretching in the first axial direction, and differentiating the temperature of the first stage and the temperature of the final stage by specific degrees.

Birefringent Index (ΔN)

In the highly insulating film of this invention, the absolute value (Δn) of the difference between the minimum value of the refractive index in the plane direction of the film (Nx) and the refractive index in the direction perpendicular to the direction showing the refractive index of Nx (Ny) is preferably 0.025 or less. When the ΔN is 0.25 or less, the physical properties in the plane direction of the film are balanced, the fine wrinkles, the deterioration of the flatness and the like due to the contraction variation can be prevented, and the heat resistance can be also further improved. From such points, ΔN is more preferably 0.020 or less, further preferably 0.018 or less and particularly preferably 0.015 or less.

Film Thickness

The thickness of the highly insulating film of this invention is preferably 0.4 μm or more and less than 6.5 μm. More preferably, the thickness is 0.4 μm or more and less than 6.0 μm, and particularly preferably 0.5 μm or more and less than 3.5 μm. By controlling the film thickness in the above numerical range, a capacitor having high capacitance can be obtained.

It is generally well known that, regarding a highly insulating film that is used as an insulator for a capacitor, the thickness is preferably thin because the capacitance of the capacitor increases. However, when the thickness of the film is actually reduced (thinning), following problems sometimes arise. The film is more likely to wrinkle. The handling property deteriorates, for example, the film breaks easily. The particles added are more likely to drop off. Further, because the particles added drop off, the breakdown voltage decreases. When the thickness of the film becomes small, the absolute value of the breakdown voltage decreases. Thus, it becomes essential to take balance of them. In order to avoid the above problems even when the film thickness is made smaller, in this invention; a highly insulating film having a new structure, in which the thermoplastic amorphous resin Y is contained, the plane orientation coefficient is adjusted in a specific range, and more preferably the antioxidant, the specific particles and the specific coating layer are included, is obtained by the production method described below.

Film Thickness Variation

The highly insulating film of this invention has preferably a thickness variation of 10% or less. When the thickness variation is lower than the upper limit, the effect to increase the electrical insulating property can be improved. When the thickness variation deteriorates, the in-plane variation of the electrical insulation property tends to become larger, and as a result, the effect to improve the electrical insulating property and the breakdown voltage characteristics tends to deteriorate. From such points, the thickness variation is preferably 9% or less, more preferably 6% or less and further more preferably 3% or less. The lower limit of the thickness variation is preferably smaller, and the thickness variation is ideally 0%, but in practice about 0.1% or more.

In order to control the thickness variation in the above numerical range, the stretching condition can be set as in the embodiments described below. In particular, it is important to make the lateral stretching condition as in the above embodiment, that is, to conduct it with dividing into several temperature regions.

Further, in order to keep an excellent thickness variation of the highly insulating film, it is also preferable that the components in the biaxially stretched film are unlikely to deteriorate. This is because, when the components such as the antioxidant and other additives are likely to deteriorate at a high temperature or the mass weights are likely to reduce, the deteriorated products of these components are likely to precipitate and attach at the extrusion die lip during the melt extrusion, and a streaky concave-convex defect is likely to occur on the film from the affect thereof. Similarly, when the contents of the components such as the antioxidant and the like and other additives and the like are too high, they are more likely to aggregate, precipitate and attach at the extrusion die lip, and the thickness variation tends to deteriorate. Accordingly, in order to achieve the above thickness variation, the thermal decomposition temperature and the content of the antioxidant may be controlled in the ranges defined in this invention.

Breakdown Voltage (BDV)

The highly insulating film of this invention preferably has breakdown voltage (BDV) at 120° C. of 350 V/μm or more. The breakdown voltage within the above numerical range means an excellent breakdown voltage even at a high temperature. The breakdown voltage is more preferably 400 V/μm or more and furthermore preferably 420 V/μm or more. In order to achieve the breakdown voltage above, the specific coating layer described above is provided, and more preferably, the embodiment of the orientation of the biaxially stretched film and the embodiment of the thermoplastic amorphous resin Y and the antioxidant in the film may be made as the preferable embodiments defined in this invention. Further, the breakdown voltage can be adjusted also by appropriately adjusting the embodiment of the inert fine particles. Furthermore, it is also effective to control the content ratio of the thermoplastic amorphous resin and the antioxidant (the polymer Y content/the antioxidant content) to a preferable range defined in this invention. When the amounts of the thermoplastic amorphous resin Y and the antioxidant are controlled low, the breakdown voltage tends to decrease. Further, when the content of the inert fine particles is controlled high, the breakdown voltage tends to decrease. Furthermore, by appropriately adjusting the contact angle of the coating layer surface in this invention and the like, the breakdown voltage can be increased and the above numerical range can be achieved.

In addition, the highly insulating film of this invention preferably has a breakdown voltage at 23° C. of 400 V/μm or more, more preferably 470 V/μm or more and further more preferably 510 V/μm or more, which can be achieved in the similar method as in the breakdown voltage at 120° C. above.

Storage Modulus (E') at 120° C.

Regarding the highly insulating film of this invention, the storage modulus (E') at 120° C. measured by the dynamic viscoelastic measurement at a frequency of 10 Hz is preferably 600 MPa or more. When the storage modulus (E') at 120° C. is within the above numerical range, the mechanical characteristics of the film under a high temperature environment are excellent. When the storage modulus at 120° C. is too low, the mechanical characteristics (such as the fracture strength and the fracture elongation) tend to deteriorate when the film is used at a high temperature. From such points, the storage modulus at 120° C. is more preferably 650 MPa or more, further more preferably 700 MPa or more and particularly preferably 750 MPa or more. In order to achieve the above storage modulus (E'), the thermoplastic amorphous resin Y is adopted and the embodiment thereof may be made as the preferable embodiments defined in this invention. When the content of the thermoplastic amorphous resin Y is lowered, the storage modulus (E') tends to decrease.

Storage Modulus (E') at 150° C.

Regarding the highly insulating film of this invention, the storage modulus (E') at 150° C. measured by the dynamic viscoelastic measurement at a frequency of 10 Hz is preferably 370 MPa or more. It can be said that, as the storage modulus (E') at 150° C. is higher, the heat resistance becomes more excellent. From such points, the storage modulus (E') at 150° C. is more preferably 400 MPa or more, further more preferably 430 MPa or more and particularly preferably 460 MPa or more. In order to achieve the storage modulus (E') at 150° C. above, it is effective that the thermoplastic amorphous resin Y is adopted and the embodiment thereof is made as the preferable embodiments defined in this invention, and that the plane orientation coefficient is controlled in the above range, for example, by increasing the draw ratio. In this regard, when the content of the thermoplastic amorphous resin Y is reduced, the storage modulus (E') tends to decrease.

Loss Modulus (E")

Regarding the highly insulating film of this invention, the peak temperature of the loss modulus (E") measured by the dynamic viscoelastic measurement at a frequency of 10 Hz is preferably 120° C. or higher and 150° C. or lower. When the peak temperature of the loss modulus (E") is appropriately high, it means that, when the highly insulating film is heated, the temperature at which the molecular movement starts to be active is appropriately high. Accordingly, the heat resistance as a film tends to improve. From such points, the peak temperature of the loss modulus (E") is more preferably 125° C. or higher, further more preferably 130° C. or higher and particularly preferably 135° C. or higher. On the other hand, when the peak temperature of the loss modulus (E") is too high, it also means that the molecular movement is not easily excited, and the breakage is more likely to occur during the biaxially stretching film production, probably because the stretching stress during the stretching becomes high. From such points, the peak temperature of the loss modulus (E") is more preferably 145° C. or lower and further more preferably 140° C. or lower. In order to achieve the peak temperature of the loss modulus (E") above, the thermoplastic amorphous resin Y may be adopted and the content thereof may be appropriately adjusted. More preferably, the content of the thermoplastic amorphous resin Y may be controlled in the preferable range defined in this invention. Further, it is also effective to control the content ratio of the thermoplastic amorphous resin Y and the antioxidant (the polymer Y content/the antioxidant content) in the preferable ranges defined in this invention. For example, when the content of the thermoplastic amorphous resin Y is increased, the peak temperature of the loss modulus (E") tends to increase. When the content of the thermoplastic amorphous resin Y is too low, the peak temperature of the loss modulus (E") tends to be too low and hardly reach 120° C.

Dielectric Loss Tangent (tan δ)

The highly insulating film of this invention preferably has a dielectric loss tangent (tan δ) at 120° C. and a frequency of 1 kHz of 0.0015 or less. When the dielectric loss tangent (tan δ) at 120° C. is high, self-heating occurs and the film tends to be damaged easily when the film is used at a high temperature (for example 120° C.) for a long time. From such points, the dielectric loss tangent (tan δ) at 120° C. is more preferably 0.0012 or less, further more preferably 0.0009 or less and particularly preferably 0.0006 or less. In order to achieve the dielectric loss tangent (tan δ) above, the thermoplastic amorphous resin Y may be adopted and the content thereof may be appropriately adjusted. More preferably, the content of the polymer Y may be controlled in the preferable range defined in this invention. Further, it is also effective to control the content ratio of the polymer Y and the antioxidant (the polymer Y content/the antioxidant content) in the preferable range defined in this invention. For example, when the content of the polymer Y is reduced, the dielectric loss tangent (tan δ) tends to decrease.

Thermal Shrinkage Rate

Regarding the highly insulating film of this invention, the average value of the thermal shrinkage rates at 200° C.×10 minutes in the longitudinal direction (the machine axis direction) and in the lateral direction (the direction perpendicular to the machine axis direction and the thickness direction) is preferably 6% or less. When the thermal shrinkage rate is within the above numerical range, the blocking occurring during the processing of a capacitor (the vapor deposition and the like) can be prevented, and it becomes easier to obtain a capacitor having excellent quality. When the thermal shrinkage rate is too high, the blocking is more likely to occur during the processing of a capacitor (the vapor deposition and the like), and it tends to be difficult to obtain an excellent product. From such points, the thermal shrinkage rate at 200° C.×10 minutes is more preferably 8% or less, further more preferably 4% or less and particularly preferably 3% or less. In order to achieve the thermal shrinkage rate above, the heat set temperature may be controlled in the range described below. When the heat set temperature is increased, the thermal shrinkage rate tends to decrease. Further, by conducting a heat relaxation treatment during the heat set or subsequent processes, the above numerical range of the thermal shrinkage rate can be achieved more effectively.

Surface Roughness

Regarding the highly insulating film of this invention, the centerline average surface roughness of the surface of at least one side thereof, or the centerline average surface roughness Ra of the surface of the coating layer, when the coating layer is provided, is preferably 7 nm or more and 89 nm or less. By controlling the centerline average surface roughness Ra in the above numerical range, the effect to improve the windability can be improved. Further, the blocking resistance improves and the roll appearance can be made excellent. When the centerline average surface roughness Ra is too small, the slidability tends to be too low, and the effect to improve the windability deteriorates. From such points, the centerline average surface roughness Ra is preferably 11 nm or more, further more preferably 21 nm or more and particularly preferably 31 nm or more. On the other hand, when the centerline average surface roughness Ra is too large, the slidability tends to be too high, and the effect to improve the windability deteriorates, for example, the edge misalignment is more likely to occur during the winding. From such points, the centerline average surface roughness Ra is more preferably 79 nm or less, further more preferably 69 nm or less and particularly preferably 59 nm or less.

Furthermore, regarding the highly insulating film of this invention, the ten-point average roughness Rz of the surface of at least one side thereof, or the ten-point average roughness Rz of the surface of the coating layer, when the coating layer is provided, is preferably 200 nm or more and 3,000 nm or less. By controlling the ten-point average roughness Rz in the above numerical range, the effect to improve the windability can be improved. When the ten-point average roughness Rz is too small, the air ventilation property tends to deteriorate during the winding as a roll, and the effect to improve the windability deteriorates, for example, the film is more likely to slip sideways. In particular, when the film thickness is small, the air ventilation property tends to further deteriorate because the elasticity of the film is lost, and the effect to improve the windability further deteriorates. From such points, the ten-point average roughness Rz is more preferably 600 nm or more, further more preferably 1,000 nm or more and particularly preferably 1,250 nm or more. On the other hand, when the ten-point average roughness Rz is too large, the number of coarse projections tends to increase, and the effect to increase the breakdown voltage deteriorates. From such points, the ten-point average roughness Rz is more preferably 2,600 nm or less, further more preferably 2,250 nm or less and particularly preferably 1,950 nm or less.

The above Ra and Rz can be achieved by adopting the inert fine particles defined by this application.

Production Method of Film

The highly insulating film of this invention can be obtained by methods, which are basically conventionally known or accumulated in this field, except for some special production methods. The production method to obtain the highly insulating film of this invention is explained in detail below.

First, an unstretched sheet is produced, by heat melting a resin composition which is obtained by preferably incorporating the inert fine particles, the polymer Y and the antioxidant to the styrene polymer having a syndiotactic structure in predetermined amounts. Specifically, the resin composition is heat melted at a temperature not lower than the melting point (Tm, unit: ° C.) of the resin composition and not higher than (Tm+50° C.), extruded in a sheet form, cooled and solidified to obtain an unstretched sheet. The intrinsic viscosity of the unstretched sheet obtained is preferably in the range of 0.35 to 0.9 dl/g. Next, this unstretched sheet is biaxially stretched. The stretching may be conducted simultaneously in the longitudinal direction (the machine axis direction) and in the lateral direction (the direction perpendicular to the machine axis direction and the thickness direction), or sequentially in an arbitrary order. For example, when it is sequential stretching, the sheet is first uniaxially stretched at a temperature, which is not lower than (the glass transition temperature (Tg, unit: ° C.) of the resin composition −10° C.) and not higher than (Tg+70° C.), to 3.2 times or more and 5.8 times or less, preferably 3.3 times or more and 5.4 times or less and further more preferably 3.4 times or more and 5.0 times or less; and then the sheet is stretched in the direction perpendicular to the first axial direction at a temperature, which is not lower than Tg and not higher than (Tg+80° C.) to 3.8 times or more and 5.9 times or less, preferably 4.0 times or more and 5.5 times or less, more preferably 4.1 times or more and 5.1 times or less and further more preferably 4.2 times or more and 4.9 times or less. Further, it is preferable that the area draw ratio (=the longitudinal draw ratio×the lateral draw ratio) is 12.0 times or more, in order to obtain a film having the plane orientation coefficient described above. When the area draw ratio decreases, the heat resistance deteriorates, which is not preferable. Therefore, the area draw ratio is more preferably 13.0 times or more, further more preferably 13.5 times or more and particularly preferably 14.0 times or more. When the area draw ratio becomes too high, the breakage is more likely to occur during the film formation or during the stretching, which is not desired. From such points, the area draw ratio is preferably 22 times or less, more preferably 20 times or less, further more preferably 18 times or less and particularly preferably 17 times or less.

In this regard, in this invention, it is preferable to form the coating layer by coating a coating liquid for forming the coating layer on the unstretched sheet or a uniaxially stretched film which is obtained by uniaxially stretching the unstretched sheet preferably in the longitudinal direction, as described below.

In this regard, during the stretching in the direction perpendicular to the uniaxial direction above, the stretching is difficult and the breakage during the film formation is more likely to occur, probably because the crystallization has progressed during the stretching in the previous stage. In particular, during the formation of a thin film having a film thickness of about 3 μm, or in the region in which the draw ratio is 4.0 times or more in particular, the breakage is more likely to occur.

The measures to solve them were considered, and it was found that it is effective to control the stretching rate in a specific numerical range during the stretching in the direction perpendicular to the uniaxial direction above. That is, when the stretching rate is too high, the film breakage is more likely to occur, probably because the change in the higher-order structure of molecules due to the stretching cannot follow the speed of the change of the film form due to the stretching and the higher-order structure is more likely to be warped. From such points, the stretching rate is preferably 30,000%/minute or less, more preferably 15,000%/minute or less, further more preferably 9,000%/minute or less and particularly preferably 6,000%/minute or less. On the other hand, when the stretching rate is too low, the stretching variation and the thickness variation are more likely to occur and thus the breakage is more likely to occur, probably because the crystallization of the film precedes during the stretching, and the variation in the stretching stress occurs. From such points, the stretching rate is preferably 500%/minute or more, more preferably 1,000%/minute or more, further more preferably 2,000%/minute or more and particularly preferably 4,000%/minute or more.

Further, it was found that, as other effective means for preventing the breakage, it is effective to divide the stretching temperature during the stretching in the direction perpendicular to the uniaxial direction above into several stages, and differentiate the temperature of the first stage and the temperature of the final stage, instead of keeping the stretching temperature constant. Regarding the temperature difference, the temperature of the final stage is preferably higher than the temperature of the first stage by 4° C. or more, more preferably 7° C. or more, further more preferably 12° C. or more and particularly preferably 15° C. or more. Further, when the temperature difference is too large, the film breakage tends to occur more easily. Furthermore, the thickness variation of the film after stretching tends to deteriorate. From such points, the temperature difference is preferably 49° C. or less, more preferably 39° C. or less, further more preferably 29° C. or less and particularly preferably 20° C. or less. By thus controlling the temperature difference between the first stage and the final stage in the above numerical range, and by further conducting three or more stages; it is possible to achieve a high draw ratio in the formation of a film having small thickness, which has been conventionally difficult, that is, a high refractive index in the thickness direction, and a low plane orientation coefficient. Further, a film excellent in terms of the thickness variation can be thus obtained.

In order to achieve the temperature difference between the first stage and the final stage in the process to conduct the stretching in the direction perpendicular to the uniaxial direction, the temperatures at the zone entrance (the first stage) and the exit (the final stage) in one stretching zone may be different, or two or more successive stretching zones with different temperatures may be provided and the temperatures of the first stretching zone (the first stage) and the final stretching zone (the final stage) may be different. Here, a zone means a region in a tenter or the like, which is partitioned with a shutter or the like. In both cases, it is preferable to further divide the stage between the first stage and the final stage and incrementally increase the temperature from the first stage to the final stage, and it is particularly excellent to increase the temperature linearly. For example, in the case of two or more successive stretching zones with different temperatures, it is preferable to further provide one or more stretching zones between the first stretching zone and the final stretching zone, and it is more preferable to provide 2 to 10 stretching zones. It is disadvantageous in terms of the facilities cost to make the total number of the stretching zones 11 or more. For example, when the film is stretched in the width direction; stretching may be conducted so that the value, which is given by dividing the film width immediately after the final stage by the film width just before the first stage, becomes the aimed draw ratio; it is preferable to incrementally increase the film width; and it is particularly good to increase the film width linearly. Also in the case of stretching simultaneously in the longitudinal direction and the lateral direction, the stretching temperature is similarly divided into several stages, and the temperature of the first stage and the temperature of the final stage are differentiated.

In this invention, as means for achieving the preferable refractive index in the thickness direction in this invention, these means can be preferably exemplified. Further, by adopting these means, the breakage is unlikely to occur even when the film thickness is reduced, and thus these means can be exemplified as preferable means for achieving the preferable film thickness in this invention. Furthermore, in this invention, it is preferable to adopt at least one embodiment among the above embodiment of the stretching rate and the embodiment of the stretching temperature; but it is more preferable to adopt both embodiments, and the stretching process is stabilized and the preferable refractive index and the preferable film thickness of this invention are achieved more easily.

Next, the heat set is conducted at a temperature of (Tg+70° C.) to Tm. The temperature of the heat set is 200° C. or higher and 260° C. or lower, preferably 225° C. or higher and 255° C. or lower and more preferably 235° C. or higher and 250° C. or lower. When the heat set temperature is too high, the film breakage is more likely to occur and the thickness variation deteriorates, in particular when a film having a small film thickness is produced. When a relaxation treatment is conducted after the heat set at a temperature 20° C. to 90° C. lower than the heat set temperature, if necessary, the dimensional stability becomes excellent.

Coating and Drying of Coating Layer

The coating layer in this invention is formed by; coating a coating liquid for forming the coating layer, which is obtained by incorporating all components constituting the coating layer described above, on the surface of the film on which the coating layer is to be formed; drying the liquid; and curing it if necessary. In this regard, the concentration and the viscosity of the coating liquid can be adjusted by diluting the coating liquid using an appropriate solvent. It is preferable to use water as the solvent because of the excellent handling property, and each component is preferably water soluble or water dispersible.

Furthermore, the formation of the coating layer may be so-called in-line method to form the coating layer during the film production, or so-called off-line method to form the coating layer after the film production. In view of the productivity and in view of the fact that a stronger coating layer can be obtained, it is preferable to adopt the in-line method. In the in-line method, the coating layer may be coated on the unstretched sheet in the film production process, coated on the uniaxially stretched film which has been uniaxially stretched in the longitudinal or lateral direction, or coated on the biaxially stretched film which has been biaxially stretched in the longitudinal and lateral direction (including films after and before the completion of orientational crystallization); but it is preferable to coat the coating layer on the unstretched sheet or the uniaxially stretched film in view of the adhesiveness of the film and the coating layer.

Specifically, in the case of the simultaneous biaxial stretching, it is preferable to coat the coating liquid on the unstretched sheet before stretching. Further, in the case of the sequential biaxial stretching, the coating liquid may be coated in the stage before stretching in the first axial direction, or the coating liquid may be coated in the stage after stretching in the first axial direction and before stretching in the second axial direction. Among them, it is preferable to coat the coating liquid in the stage after stretching in the first axial direction and before stretching in the second axial direction, because it is easier to prevent the scratches from arising, the heat set treatment, which accelerates the crystallization, is conducted after stretching, and the structure of the coating layer is more likely to be stable.

Further, the coating film obtained by coating the coating liquid is preferably dried to some extent before starting the next process. For example, in the case of stretching after coating, when the coating film is not sufficiently dried, the temperature variation in the film is likely to occur during the stretching, the stretching variation occurs and the thickness variation in the film is more likely to deteriorate.

The drying of the coating film may be conducted independently after coating the coating liquid, or conducted subsequently to the coating process by providing a drying process before the stretching process; or the preheating process in the stretching process may be used also as the drying process of the coating film. Regarding the drying temperature, the lower limit is 60° C. or higher, preferably 70° C. or higher and more preferably 80° C. or higher, and the upper limit is preferably 125° C. or lower, more preferably 115° C. or lower and further more preferably 105° C. or lower; and the drying time is preferably 0.1 minutes or longer and 10 minutes or shorter. When the drying temperature is too high or the drying time is too long, the crystallization of the film progresses before stretching, the stretchability deteriorates due to the increase in the stretching stress and the like, and the breakage during the stretching tends to be frequent; and when the drying temperature is too low or the drying time is too short, the coating liquid tends to dry insufficiently, the dilution solvent remains in the coating film and evaporates also in the stretching process, the stretching variation is likely to arise, and the film thickness variation tends to deteriorate.

The above points were further considered, and it was found that they depend more on the drying temperature than the drying time, and as a result, it was found that the value of [the drying temperature (° C.)×the drying temperature (° C.)×the drying time (minutes)] is preferably 1,000 or more, more preferably 3,000 or more and further more preferably 8,000 or more, and preferably 100,000 or less, more preferably 70,000 or less and further more preferably 30,000 or less.

In this regard, when the drying process of the coating film and the stretching process are separated, the drying temperature is represented by the average of the temperature at the beginning of the drying process and the temperature at the end of the drying process; and when the drying process is conducted subsequently to the coating of the coating liquid before the stretching process, the drying temperature is represented by the average of the temperature at the beginning of the drying process and the temperature of the final part of the drying process (the temperature at the beginning of the stretching process). The preheating part before the stretching process sometimes serves as the drying process.

Here, this invention aims to provide a highly insulating film having an excellent heat resistance and increased breakdown voltage, but, when the heat resistance is not required so much, the provision of a highly insulating film having increased breakdown voltage may be an object as the following second invention.

That is, the present inventors conducted extensive research to solve the above problems so as to provide a highly insulating film having increased breakdown voltage; and as a result found that the breakdown voltage increases, by making a syndiotactic polystyrene biaxially stretched film to have a specific orientation structure, and further by providing a coating layer having a specific water contact angle on at least one side thereof; thereby accomplished the second invention.

That is, the second invention adopts the following structure 1'.

1'. A highly insulating film, which contains a biaxially stretched film containing a styrene polymer having a syndiotactic structure as a main component and having a refractive index in the thickness direction of 1.580 or more and 1.635 or less, and a coating layer, which is provided on at least one side of the biaxially stretched film and has a water contact angle of the surface of 85° or more and 120° or less.

Further, this invention includes the following structures 2' to 14' as preferable embodiments thereof.

2'. The highly insulating film described in the above 1' in which the biaxially stretched film contains a polymer Y having a glass transition temperature Tg by DSC of 130° C. or higher in an amount of 5% by mass or more and 48% by mass or less relative to the mass of the biaxially stretched film.

3'. The highly insulating film described in the above 1' or 2' in which the biaxially stretched film contains an antioxidant in an amount of 0.1% by mass or more and 8% by mass or less relative to the mass of the biaxially stretched film.

4'. The highly insulating film described in the above 1' in which
the biaxially stretched film contains a polymer Y having a glass transition temperature Tg by DSC of 130° C. or higher in an amount of 5% by mass or more and 48% by mass or less relative to the mass of the biaxially stretched film, and
contains an antioxidant in an amount of 0.1% by mass or more and 8% by mass or less relative to the mass of the biaxially stretched film, and
the content ratio of the polymer Y and the antioxidant (the polymer Y content/the antioxidant content) is 1 to 100.

5'. The highly insulating film described in any one of the above 1' to 4' in which the coating layer contains at least one kind selected from the group consisting of a wax component, a silicone component and a fluorine compound in an amount of 41% by mass or more and 94% by mass or less based on the mass of the coating layer.

6'. The highly insulating film described in the above 5' in which the wax component is polyolefin wax.

7'. The highly insulating film described in the above 2' or 4' in which the polymer Y is polyphenylene ether represented by the above formula.

8'. The highly insulating film described in the above 3' or 4' in which the thermal decomposition temperature of the antioxidant is 250° C. or higher.

9' The highly insulating film described in any one of the above 1' to 8' in which the biaxially stretched film contains an inert fine particle having an average particle diameter of 0.05 μm or more and 3.0 μm or less in an amount of 0.05% by mass or more and 3% by mass or less relative to the mass of the biaxially stretched film.

10'. The highly insulating film described in any one of the above 1' to 9' in which the thickness is 0.4 μm or more and 6.5 μm or less.

According to the second invention, a highly insulating film having increased breakdown voltage can be provided.

Further, according to preferable embodiments of the second invention, a highly insulating film excellent in the electrical characteristics, heat resistance and handling property can be provided. In particular, a highly insulating film having high breakdown voltage can be obtained. Accordingly, the highly insulating film obtained by this invention can be suitably used as an insulator for a capacitor.

The highly insulating film of the second invention contains a biaxially stretched film containing the above styrene polymer as a main component, and a coating layer provided on at least one side thereof and having a water contact angle of the surface of 85° or more and 120° or less. Here, the "main" represents exceeding 50% by mass, preferably 55% by mass or more, more preferably 60% by mass or more and particularly preferably 65% by mass or more, based on the mass of the biaxially stretched film. When the proportion of the styrene polymer described below is less than the lower limit, the film formability such as stretching deteriorates. Further, the biaxially stretched film of this invention preferably contains the inert fine particles, the antioxidant and the polymer Y having a glass transition temperature Tg by DSC of 130° C. or higher described below. Each component constituting the highly insulating film of the second invention is described below.

First, regarding the styrene polymer, the antioxidant, the polymer Y, the inert fine particles, the other additives, the coating layer and the metal layer, which constitute the highly insulating film of the second invention, the similar contents to those described above apply.

Next, regarding the film characteristics of the highly insulating film of the second invention, the similar contents to those described above apply for the refractive index in the thickness direction, the film thickness, the film thickness variation, the breakdown voltage (BDV), the storage modulus (E') at 120° C., the loss modulus (E"), the dielectric loss tangent (tan δ), the thermal shrinkage rate and the surface roughness.

Production Method of Highly Insulating Film of the Second Invention

The highly insulating film of the second invention can be obtained by methods, which are basically conventionally known or accumulated in this field, except for some special production methods. The production method to obtain the highly insulating film of this invention is explained in detail below.

First, an unstretched sheet is produced, by heat melting a resin composition which is obtained by preferably incorporating the inert fine particles, the polymer Y and the antioxidant to the styrene polymer having a syndiotactic structure in predetermined amounts. Specifically, the resin composition is heat melted at a temperature not lower than the melting point (Tm, unit: ° C.) of the resin composition and not higher than (Tm+50° C.), extruded in a sheet form, cooled and solidified to obtain an unstretched sheet. The intrinsic viscosity of the unstretched sheet obtained is preferably in the range of 0.35 to 0.9 dl/g. Next, this unstretched sheet is biaxially stretched. The stretching may be conducted simultaneously in the longitudinal direction (the machine axis direction) and in the lateral direction (the direction perpendicular to the machine axis direction and the thickness direction), or sequentially in an arbitrary order. For example, when it is sequential stretching, the sheet is first uniaxially stretched at a temperature, which is not lower than (the glass transition temperature (Tg, unit: ° C.) of the resin composition −10° C.) and not higher than (Tg+70° C.), to 2.7 times or more and 4.8 times or less, preferably 2.9 times or more and 4.4 times or less and further more preferably 3.1 times or more and 4.0 times or less; and then the sheet is stretched in the direction perpendicular to the uniaxial direction at a temperature, which is not lower than Tg and not higher than (Tg+80° C.) to 2.8 times or more and 4.9 times or less, preferably 3.0 times or more and 4.5 times or less and more preferably 3.2 times or more and 4.1 times or less.

In this regard, in this invention, it is preferable to form the coating layer by coating a coating liquid for forming the coating layer on the unstretched sheet or a uniaxially stretched film, which is obtained by uniaxially stretching the unstretched sheet preferably in the longitudinal direction, as described below.

In this regard, during the stretching in the direction perpendicular to the uniaxial direction above, the stretching is difficult and the breakage during the film formation is more likely to occur, probably because the crystallization has progressed during the stretching in the previous stage. In particular, during the formation of a thin film having a film thickness of about 3 μm, or in the region in which the draw ratio is 3.2 times or more in particular, the breakage is more likely to occur.

The measures to solve them were considered, and it was found that it is effective to control the stretching rate in a specific numerical range during the stretching in the direction perpendicular to the uniaxial direction above. That is, when the stretching rate is too high, the film breakage is more likely to occur, probably because the change in the higher-order structure of molecules due to the stretching cannot follow the speed of the change of the film form due to the stretching and the higher-order structure is more likely to be warped. From such points, the stretching rate is preferably 30,000%/minute or less, more preferably 15,000%/minute or less, further more preferably 9,000%/minute or less and particularly preferably 6,000%/minute or less. On the other hand, when the stretching rate is too low, the stretching variation and the thickness variation are more likely to occur and thus the breakage is more likely to occur, probably because the crystallization of the film precedes during the stretching, and the variation in the stretching stress occurs. From such points, the stretching rate is preferably 500%/minute or more, more preferably 1,000%/ minute or more, further more preferably 2,000%/minute or more and particularly preferably 4,000%/minute or more.

Further, it was found that, as other effective means for preventing the breakage, it is effective to divide the stretching temperature during the stretching in the direction perpendicular to the uniaxial direction above into several stages, and differentiate the temperature of the first stage and the temperature of the final stage, instead of keeping the stretching temperature constant. Regarding the temperature difference, the temperature of the final stage is preferably higher than the temperature of the first stage by 4° C. or more, more preferably 7° C. or more, further more preferably 12° C. or more and particularly preferably 15° C. or more. Further, when the temperature difference is too large, the film breakage tends to occur more easily. Furthermore, the thickness variation of the film after stretching tends to deteriorate. From such points, the temperature difference is preferably 49° C. or less, more preferably 39° C. or less, further more preferably 29° C. or less and particularly preferably 20° C. or less. By thus controlling the temperature difference between the first stage and the final stage in the above numerical range, it is possible to achieve a high draw ratio in the formation of a film having a small thickness, which has been conventionally difficult, that is, a high refractive index in the thickness direction. Further, a film excellent in terms of the thickness variation can be thus obtained.

In order to achieve the temperature difference between the first stage and the final stage in the process to conduct the stretching in the direction perpendicular to the uniaxial direction, the temperatures at the zone entrance (the first stage) and the exit (the final stage) in one stretching zone may be different, or two or more successive stretching zones with different temperatures may be provided and the temperatures of the first stretching zone (the first stage) and the final stretching zone (the final stage) may be different. Here, a zone means a region in a tenter or the like, which is partitioned with a shutter or the like. In both cases, it is preferable to further divide the stage between the first stage and the final stage and incrementally increase the temperature from the first stage to the final stage, and it is particularly excellent to increase the temperature linearly. For example, in the case of two or more successive stretching zones with different temperatures, it is preferable to further provide one or more stretching zones between the first stretching zone and the final stretching zone, and it is more preferable to provide 1 to 10 stretching zones. It is disadvantageous in terms of the facilities cost to make the total number of the stretching zones 11 or more. For example, when the film is stretched in the width direction; stretching may be conducted so that the value, which is given by dividing the film width immediately after the final stage by the film width just before the first stage, becomes the aimed draw ratio; it is preferable to incrementally increase the film width; and it is particularly good to increase the film width linearly. Also in the case of stretching simultaneously in the longitudinal direction and the lateral direction, the stretching temperature is similarly divided into several stages, and the temperature of the first stage and the temperature of the final stage are differentiated.

In this invention, as means for achieving the preferable refractive index in the thickness direction in this invention, these means can be preferably exemplified. Further, by adopting these means, the breakage is unlikely to occur even when the film thickness is reduced, and thus these means can be exemplified as preferable means for achieving the preferable film thickness in this invention. Furthermore, in this invention, it is preferable to adopt at least one embodiment among the above embodiment of the stretching rate and the embodiment of the stretching temperature; but it is more preferable to adopt both embodiments, and the stretching process is stabilized and the preferable refractive index and preferable film thickness of this invention are achieved more easily.

Next, the heat set is conducting at a temperature of (Tg+70° C.) to Tm. The temperature of the heat set is 200° C. or higher and 260° C. or lower, preferably 220° C. or higher and 250° C. or lower and more preferably 230° C. or higher and 240° C. or lower. When the heat set temperature is too high, the film breakage is more likely to occur and the thickness variation deteriorates, in particular when a film having a small film thickness is produced. When a relaxation treatment is conducted after the heat set at a temperature 20° C. to 90° C. lower than the heat set temperature, if necessary, the dimensional stability becomes excellent.

Further, the similar contents to those described above apply to the coating and drying of the coating layer.

EXAMPLES

Next, this invention is described further in detail by Examples and Comparative Examples. Further, each characteristic value in examples was measured and evaluated in the following method.

(1) Average Particle Diameter and Particle Diameter Ratio of Particles

A powder was scattered on a sample table so that the particles did not overlap each other, and a gold thin film vapor-deposited layer was formed on the surface thereof with a thickness of 200 to 300 Å using a gold-sputtering apparatus. Next, the particles were observed using a scanning electron microscope at a magnification of 10,000 to 30,000, and using Luzex 500 manufactured by Nippon Regulator, the area-equivalent particle diameter (Di), the long diameter (Dli) and the short diameter (Dsi) were measured for at least 1,000 particles.

Further, the relative standard deviation of the powder was calculated from the area-equivalent particle diameter (Di) and the average particle diameter (D) measured for each particle by the following equation.

$$\text{Relative Standard Deviation} = \frac{\sqrt{\sum_{i=1}^{n}(Di-D)^2/n}}{D} \quad \text{[Equation 1]}$$

(2) Surface Roughness (Ra) of Film

The projection profile on the surface of the coating layer of the highly insulating film is measured, using a non-contact three-dimensional roughness meter (manufactured by Kosaka Laboratory Ltd., ET-30HK), with a semiconductor laser having a wavelength of 780 nm and an optical probe having a beam diameter of 1.6 μm, under the conditions of measurement length (Lx) of 1 mm, sampling pitch of 2 μm, cut-off of 0.25 mm, magnification in the thickness direction of 10,000 times, magnification in the lateral direction of 200 times, and number of scanning lines of 100 (accordingly, measurement length in the Y direction Ly=0.2 mm). The value obtained by the following equation, when the roughness curve was expressed by Z=f (x,y), was taken as the centerline average surface roughness (Ra, unit: nm) of the film.

$$Ra = 1/(LxLy) \int_0^{Lx} \int_0^{Ly} |f(x,y)| dx dy \quad \text{[Equation 2]}$$

(3) Thermal Shrinkage Rate

The thermal shrinkage rates of the film (in the longitudinal direction and in the lateral direction) (unit: %) under an atmosphere of no tension at 200° C. for 10 minutes were measured and the average thereof was taken as the average thermal shrinkage rate.

(4) Refractive Index

Using an Abbe refractometer with sodium D-line (589 nm) as the light source and at 23° C. 65% RH, the direction in which the refractive index was smallest was determined in the plane direction and the refractive index was determined as (Nx), the refractive index in the direction perpendicular thereto was determined as (Ny), and further the refractive index in the thickness direction (Nz) was measured. Further, the plane orientation coefficient (ΔP) was calculated from the following equation.

$$\Delta P = (Nx + Ny)/2 - Nz$$

In addition, the birefringent index (ΔN) was measured by the following equation.

$$\Delta N = Nx - Ny$$

(5) Breakdown Voltage (BDV)

The breakdown voltage was measured in accordance with the plate electrode method shown in JIS C 2151. Under an atmosphere of 23° C. relative humidity of 50%, using a direct current withstand voltage testing machine, and using a brass cylinder having a diameter of 25 mm as the upper electrode and an aluminum cylinder having a diameter of 75 mm as the lower electrode, the voltage (unit: V) at which the film broke and short-circuited was measured with increasing the pressure with the rate of 100 V/second. The voltage obtained was divided by the film thickness (unit: μm) to give the breakdown voltage (unit: V/μm). The measurement was conducted at 41 points, the points showing the ten largest values and the ten smallest values were excluded, and the intermediate value of the remaining 21 points was taken as the measured value of the breakdown voltage.

Regarding the measurement at 120° C., the electrodes and the sample were set in a hot air oven, the oven was connected to a power supply through a heat-resistant cord, the pressure rising was started in 1 minute after placing them in the oven and the measurement was conducted in the same way as above.

(6) Stretchability

The stretchability was judged as follows, by the number of the breakages occurring during the film formation of a 50,000 m biaxially stretched film.

Stretchability ○○: Less than one breakage per 50,000 m film formation

Stretchability ○: One to less than two breakages per 50,000 m film formation

Stretchability Δ: Two to less than four breakages per 50,000 m film formation

Stretchability X: Four to less than eight breakages per 50,000 m film formation

Stretchability XX: Eight or more breakages per 50,000 m film formation (7) Windability The film was wound in a 7,000 m roll form with a width of 500 mm with a rate of 160 m/minute during the film formation process, and the wound configuration of the roll obtained and the edge misalignment at the roll edges were ranked as follows.

[Wound Configuration]

A: There is no pimple on the roll surface, and the wound configuration is excellent.

B: There are one or more to less than four pimples on the roll surface (projecting embossments), and the wound configuration is almost excellent.

C: There are four or more to less than ten pimples on the roll surface (projecting embossments), and it can be used as a product although the wound configuration is slightly poor.

D: There are ten or more pimples on the roll surface (projecting embossments), the wound configuration is poor and it cannot be used as a product.

[Edge Misalignment]

○○: The edge misalignment at the roll edges is less than 0.5 mm, and it is excellent.

○: The edge misalignment at the roll edges is 0.5 mm or more to less than 1 mm and it is almost excellent.

Δ: The edge misalignment at the roll edges is 1 mm or more to less than 2 mm, and it is slightly poor but can be used as a product.

X: The edge misalignment at the roll edges is 2 mm or more, and it is poor and cannot be used as a product.

XX: The edge misalignment becomes large during the roll winding and a 7,000 m roll cannot be formed.

(8) Thermal Decomposition Temperature

The measurement was conducted under an air atmosphere with a temperature increasing rate of 10° C./minute, using a differential thermal/thermogravimetric simultaneous measurement device (manufactured by Seico Electronics Industrial Co., Ltd.: product name TG/DTA220), and the temperature at which the weight started to change was determined by a tangent method from the temperature/weight change curve to give the thermal decomposition temperature (unit: ° C.).

(9) Glass Transition Temperature and Melting Point

About 20 mg of a sample was enclosed in a pan made of aluminum for measurement, it was attached to a differential scanning calorimeter (DSC) (manufactured by TA Instruments: product name DSCQ 100), the temperature was raised from room temperature (25° C.) to 280° C. at a rate of 20° C./minute, and the melting point was measured. The sample was then rapidly cooled, then the temperature was raised again at a rate of 20° C./minute, and the glass transition temperature (unit: ° C.) was measured.

(10) Storage Modulus (E'), Loss Modulus (E") and Dielectric Loss Tangent (tan δ)

The storage modulus (E') (unit: MPa) and the loss modulus (E") (unit: MPa) of the film sample were measured using a dynamic viscoelastic measurement device (manufactured by Orientec Co., Ltd, DDV-01FP), with raising the temperature from 25° C. to 230° C. at a rate of 2° C./minute, under a condition of a frequency of 10 Hz. At this point, the sample length was 4 cm in the measurement direction×3 cm in the width direction (between chucks: 3 cm). From the above measurement results, the peak temperature (unit: ° C.) of the loss modulus (E"), the storage modulus at 120° C. and the storage modulus (E') at 150° C. (unit: MPa) were calculated. In this regard, each measurement was conducted in the longitudinal direction and in the lateral direction of the film, and an average value thereof was calculated.

Further, the dielectric loss tangent (tan δ) was measured using the dielectric loss measurement device manufactured by Ando Electric Co., Ltd. (TR-10C) at 120° C. under a condition of a frequency of 1 kHz. The sample was formed by aluminum vapor deposition in accordance with JIS C 2151. In this regard, the measurement was conducted in the longitudinal direction and in the lateral direction of the film, and an average value thereof was calculated.

(11) Heat Resistance (Shearing Force after Thermal Compression Bonding)

Figure 1B:
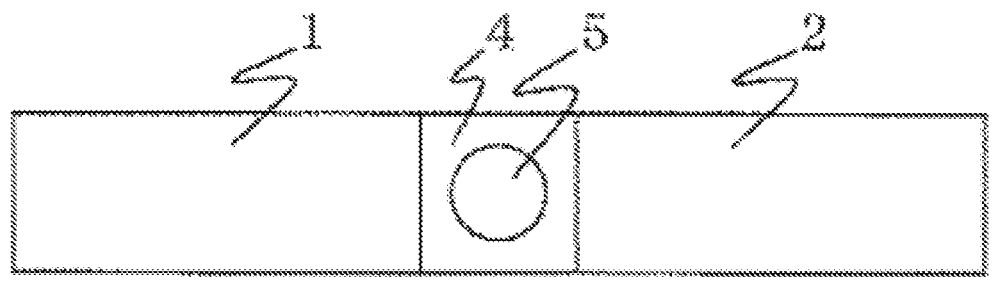
FIG. 1B shows a view from the vertical direction of the sample and the device for measuring shearing force.

The shearing force was measured with the device shown in FIGS. 1A and 1B. FIG. 1B is a figure of the sample and the device seen from the horizontal direction, and FIG. 1B is a figure of the sample and the device seen from the upper side of the vertical direction.

1 and 2 in FIGS. 1A and 1B are the evaluated samples 1 and 2 cut into 50 mm in the film formation direction and 200 mm in the width direction, 3 is a square heat plate of 50 mm×50 mm placed horizontally, and the sample 1 and the sample 2 were placed as shown in FIGS. 1A and 1B. At this point, when the samples 1 and 2 have a coating layer at only one side thereof, the samples were placed so that the coating layer and the heat plate did not face each other, and the sample 2 placed was placed thereon so that the side different from the sample 1 was attached. Further, a flat and smooth paper 4 was placed further thereon. Further, the lower heat plate was heated to 125° C., a terminal 5 having a pressure bonding area of 6.16 square cm (φ28 mm) was lowered from the upper part in the vertical direction, and the thermal compression bonding of the sample was conducted at a pressure of 1 MPa and for 60 seconds.

Then, the both edges of the thermal-compression-bonded film in the film formation direction were held and pulled using a load cell, and the maximum load at which the thermal-compression-bonded part broke was measured. The measurement was conducted five times, the maximum value and the minimum value thereof were excluded, and the average of the remaining three values was calculated to give the shearing force. It can be said, that the heat resistance is more excellent, as the shearing force is smaller.

(12) Water Contact Angle

The measurement was conducted five times on the coating layer surface of the film using a contact angle indicator manufactured by Kyowa Interface Science Co., Ltd. (type: CA-A), and the average value thereof was taken as the water contact angle) (°).

In this regard, the measurement was conducted by slowly dropping 0.2 mL of distillated water with a syringe on the coating layer surface from the height of 5 mm, leaving it for 30 seconds, and then observing the contact angle (the angle formed by the coating layer surface and the tangent line of the droplet) with a CCD camera. Further, the similar operation was repeated five times, and the average value was used.

(13) Film Thickness and Thickness Variation

The thicknesses of the film were measured at 10 points equally from sections of 0.5 m in the longitudinal direction and the lateral direction using an electronic micrometer, and the average thickness (unit: μm) was calculated. The ratio (percentage) of the difference between the largest thickness (unit: μm) and the smallest thickness (unit: μm) among the measured values to the average thickness (unit: μm) was calculated to give the thickness variation (unit: %). The thickness variations in the longitudinal direction and the lateral direction were taken as the measured values.

(14) Weight-Average Molecular Weight of Syndiotactic Polystyrene

To 1 mg of the film, 0.5 ml of HFIP:chloroform (1:1) was added and dissolved (overnight), 9.5 ml of chloroform was added just before the measurement, the solution was filtered with a 0.1 μm membrane filter, and GPC analysis was conducted. The measurement devices and the conditions are as follows.

GPC: HLC-8020 (a GPC manufactured by Tosoh Corporation)

Detector: UV-8010 (a detector manufactured by Tosoh Corporation)

Column: TSK-GELGMHHR·M×2 (a column manufactured by Tosoh Corporation)

Mobile Phase: chloroform for HPLC

Flow Rate: 1.0 ml/min

Column Temperature: 40° C.

Detector: UV (254 nm)

Injected Amount: 200 μl

Sample for Calibration Curve: polystyrene (EASICAL "PS-1", a polystyrene manufactured by Polymer Laboratories)

Composition Example 1

Preparation of the Coating Liquid 1

As the preparation of the coating liquid 1, the following releasing component, surfactant and cross-linking agent with the weight ratios shown in Table 1 were dispersed in water so that the weight of the solid components became 5% by mass to prepare an aqueous emulsion solution.

Releasing component: polyethylene wax (manufactured by Takamatsu Oil & Fat Co., Ltd., product name: U3, an emulsion of polyethylene wax, it was described so that the amount of the polyethylene wax in the emulsion became the content of the releasing component in Table 1)

Surfactant: polyoxyalkylene alkylether (manufactured by Lion Corporation, product name L950, a surfactant)

Cross-linking agent: ammonium zirconium carbonate

Composition Examples 2 to 4

Preparation of the Coating Liquids 2 to 4

The same operation as in Composition Example 1 was repeated except that the content of the polyethylene wax was changed as shown in Table 1, and that the binder resin a having the following composition was included in the content shown in Table 1.

Binder Resin a: acrylic modified polyester

Polyester component: terephthalic acid 50% by mole/ isophthalic acid 45% by mole/5-sodium sulfoisophthalate 5% by mole/ethylene glycol 75% by mole/diethylene glycol 25% by mole Acrylic component: methyl methacrylate 90% by mole/ glycidyl methacrylate 10% by mole Molar ratio of the repeating units of the polyester resin component/the acrylic resin component=3/7

Composition Example 5

Preparation of the Coating Liquid 5

As the preparation of the coating liquid 5, the following releasing component, surfactant and cross-linking agent were dispersed in water so that the weight of the solid components became 5% by weight to prepare an aqueous emulsion solution. In this regard, the silicone compound was previously mixed with the surfactant and then added to the coating liquid.

Releasing component: carboxy modified silicone (manufactured by Shin-Etsu Chemical Co., product name X22-3701E, a releasing agent)

Surfactant: polyoxyethylene (n=8.5) laurylether (manufactured by Sanyo Kasei Co. Ltd., product name NAROACTY N-85, a surfactant)

Cross-linking agent: oxazoline (manufactured by Nippon Shokubai Co., Ltd., product name EPOCROS WS-300, a cross-linking agent)

This unstretched sheet was stretched to 3.5 times at 140° C. in the longitudinal direction (the machine axis direction); then the coating liquid 1 (a 5% by mass water dispersible coating liquid) including the components described in Table 1 was coated on one side of the longitudinally stretched film so that the thickness of the finally obtained coating layer became 40 nm; the film was then guided to a tenter; preheating was conducted while the coating liquid was dried for 9 seconds in the process in which the temperature at the

TABLE 1

| | | | | Coating liquid | | | | |
|---|---|---|---|---|---|---|---|---|
| | | | — | Coating liquid 1 | Coating liquid 2 | Coating liquid 3 | Coating liquid 4 | Coating liquid 5 |
| Coating layer | Releasing agent | Type | — | Polyethylene wax | Polyethylene wax | Polyethylene wax | Polyethylene wax | Carboxy modified silicone |
| | | Content | Weight % | 80 | 60 | 45 | 25 | 80 |
| | Cross-linking agent | Type | — | Ammonium zirconium carbonate | Ammonium zirconium carbonate | Ammonium zirconium carbonate | Ammonium zirconium carbonate | Oxazoline |
| | | Content | Weight % | 5 | 5 | 5 | 5 | 5 |
| | Surfactant | Type | — | Polyoxy-alkylene alkyl ether | Polyoxy-alkylene alkyl ether | Polyoxy-alkylene alkyl ether | Polyoxy-alkylene alkyl ether | Polyoxy-ethylene (n = 8.5) lauryl ether |
| | | Content | Weight % | 15 | 15 | 15 | 15 | 15 |
| | Binder resin | Type | | — | a | a | a | — |
| | | Content | Weight % | — | 20 | 35 | 55 | — |
| | Concentration of coating layer component in coating liquid | | Weight % | 5 | 5 | 5 | 5 | 5 |

The coating liquids 1 to 5 in Table 1 were prepared in Composition Examples 1 to 5, respectively, and the binder resin a means the acrylic modified polyester in Composition Examples 2 to 4 above.

Example 1

A resin composition was obtained by incorporating: 67.5 parts by mass of polystyrene, which has a weight-average molecular weight of $3.0\times10^5$ and in which a nearly perfect syndiotactic structure is observed by $^{13}$C-NMR measurement; 30 parts by mass of poly(2,6-dimethyl-1,4-phenylene) ether (the intrinsic viscosity measured in chloroform is 0.32 dl/g and the glass transition temperature is 210° C.) as the thermoplastic amorphous resin Y; 2 parts by mass of pentaerythritoltetrakis[3-(3,5-di-t-butyl-4-hydroxyphenyl)propionate] (manufactured by Ciba Specialty Chemicals Inc.: product name IRGANOX1010, an antioxidant, melting point 120° C., thermal decomposition temperature 335° C.) as the antioxidant (C1); 0.4 parts by mass (corresponding to 0.4% by mass in 100% by mass of the biaxially stretched film obtained) of spherical silica particles having an average particle diameter of 0.3 μm, a relative standard deviation of 0.16 and a particle diameter ratio of 1.09 as the inert fine particle A; and 0.1 parts by mass (corresponding to 0.1% by mass in 100% by mass of the biaxially stretched film obtained) of spherical silicone resin particles having an average particle diameter of 1.2 μm, a relative standard deviation of 0.15 and a particle diameter ratio of 1.10 as the inert fine particle B.

The resin composition obtained was dried at 120° C. for 7 hours, supplied into an extruder, melted at 300° C., extruded through a die slit, and then cooled and solidified on a casting drum cooled at 50° C.; and an unstretched sheet was prepared.

beginning of the preheating was 95° C. and the temperature at the end of the preheating (the temperature at the beginning of the stretching) was 1126° C.; and then the film was stretched to 4.5 times in the lateral direction (the direction perpendicular to the machine axis direction and the thickness direction). At this point, the stretching part was divided into four equally divided zones and the stretching rate in the lateral direction was 5,000%/minute. Further, the temperature for stretching in the lateral direction was also divided into four equally divided stages with the temperature of the first stage of 126° C. and the temperature of the final stage of 145° C. Then, the heat set was conducted at 250° C. for 9 seconds, the 2% relaxation treatment was conducted in the lateral direction while the film was cooled to 180° C., and a biaxially stretched film having a thickness of 3.0 μm was obtained and wound in a roll. The characteristics of the film obtained are shown in Table 2.

Examples 2 to 6 and Comparative Examples 1 and 2

A similar operation was conducted as in Example 1 except that the condition of the film formation (the draw ratios) was changed as in Table 2, and the characteristics of the films obtained are shown in Table 2. Those formed with a high draw ratio during the film formation had excellent heat resistance; but, when the draw ratio was low, the storage modulus (E') at a high temperature (150° C.) deteriorated, the shearing force after the thermal compression bonding at a high temperature, which corresponds to the heat resistance at the capacitor processing stage, increased, and thus the heat resistance deteriorated.

Examples 7 and 8 and Comparative Examples 3 and 4

A similar operation was conducted as in Example 1, except that the mixing ratio of the polystyrene and the thermoplastic amorphous resin Y was changed and the stretching condition of the film formation was changed as shown in Table 2. The characteristics of the films obtained are shown in Table 2.

When the amount of the thermoplastic amorphous resin Y was low, the storage modulus (E') at a high temperature (150° C.) decreased, the shearing force after the thermal compression bonding at a high temperature increased, and thus the heat resistance at the capacitor processing stage deteriorated. Further, when the amount of the thermoplastic amorphous resin Y was too high, the stretchability deteriorated and a film in a roll form was difficult to obtain, probably because the constitution of the mixture became unstable.

Example 9

A similar operation was conducted as in Example 2 except that the thermoplastic amorphous resin Y was changed to bisphenol A type polycarbonate (IDEMITSU POLYCARBONATE A300, a bisphenol A type polycarbonate manufactured by Idemitsu Petrochemical Co., Ltd., the glass transition temperature is 145° C.) as shown in Table 2. The characteristics of the film obtained are shown in Table 2.

Examples 10 and 11

A similar operation was conducted as in Example 1 except that the content of the antioxidant was changed as shown in Table 2. The characteristics of the films obtained are shown in Table 2.

Example 12

A similar operation was conducted as in Example 1 except that the antioxidant (C1) was changed to the antioxidant (C2): octadecyl-3-(3,5-di-t-butyl-4-hydroxyphenyl)propionate (manufactured by Ciba Specialty Chemicals Inc.: product name IRGANOX1076, an antioxidant, melting point 52° C., thermal decomposition temperature 230° C.). The characteristics of the film obtained are shown in Table 2.

Example 13

A similar operation was conducted as in Example 1 except that the coating layer was not formed, and the characteristics of the film obtained are shown in Table 2. Although the breakdown voltage decreased slightly, the storage modulus (E') at a high temperature (150° C.) was high and the heat resistance was excellent.

Examples 14 to 17

A similar operation was conducted as in Example 1 except that the coating liquid was changed as shown in Table 2, and the characteristics of the films obtained are shown in Table 2.

TABLE 2

| | | | Example 1 | Example 2 | Example 3 | Example 4 | Example 5 | Example 6 | Comparative Example 1 | Comparative Example 2 | Example 7 | Example 8 | Comparative Example 3 | Comparative Example 4 |
|---|---|---|---|---|---|---|---|---|---|---|---|---|---|---|
| Thermoplastic amorphous resin Y | Type | — | PPE | PPE | PPE | PPE | PPE | PPE | PPE | PPE | PPE | PPE | — | PPE |
| | Glass transition temperature Tg | ° C. | 210 | 210 | 210 | 210 | 210 | 210 | 210 | 210 | 210 | 210 | — | 210 |
| | Content | Mass % | 30 | 30 | 30 | 30 | 30 | 30 | 30 | 30 | 20 | 40 | — | 50 |
| Antioxidant | Type | — | C1 | C1 | C1 | C1 | C1 | C1 | C1 | C1 | C1 | C1 | C1 | C1 |
| | Melting point | ° C. | 120 | 120 | 120 | 120 | 120 | 120 | 120 | 120 | 120 | 120 | 120 | 120 |
| | Thermal decomposition temperature | ° C. | 335 | 335 | 335 | 335 | 335 | 335 | 335 | 335 | 335 | 335 | 335 | 335 |
| | Content | Mass % | 15 | 15 | 15 | 15 | 15 | 15 | 15 | 15 | 10 | 20 | 2 | 25 |
| Content ratio of polymer Y and antioxidant (polymer Y content/antioxidant content) | | — | 2 | 2 | 2 | 2 | 2 | 2 | 2 | 2 | 2 | 2 | — | 2 |
| Coating layer | Water contact angle of coating layer surface | ° | 98 | 98 | 98 | 98 | 98 | 98 | 98 | 98 | 98 | 98 | 98 | 98 |
| | Coating liquid | — | Coating liquid 1 | Coating liquid 1 | Coating liquid 1 | Coating liquid 1 | Coating liquid 1 | Coating liquid 1 | Coating liquid 1 | Coating liquid 1 | Coating liquid 1 | Coating liquid 1 | Coating liquid 1 | Coating liquid 1 |
| | Coating thickness | nm | 40 | 40 | 40 | 40 | 40 | 40 | 40 | 40 | 40 | 40 | 40 | 40 |
| Film formation condition | Longitudinal stretching Draw ratio | Time | 3.5 | 3.2 | 3.3 | 3.4 | 3.5 | 3.7 | 3.1 | 3 | 3.5 | 3.5 | 3.5 | 3.5 |
| | Temperature | ° C. | 140 | 140 | 140 | 140 | 140 | 140 | 140 | 140 | 131 | 143 | 120 | 157 |
| | Lateral stretching Draw ratio | Time | 4.2 | 4 | 4.1 | 4.1 | 4.1 | 4.4 | 3.4 | 3.9 | 4.2 | 4.2 | 4.2 | 4.2 |
| | First stage temperature | ° C. | 126 | 126 | 126 | 126 | 126 | 126 | 126 | 126 | 117 | 192 | 108 | 136 |
| | Heat treatment Final temperature | ° C. | 145 | 145 | 145 | 145 | 145 | 145 | 145 | 145 | 136 | 154 | 127 | 162 |
| | Temperature | ° C. | 250 | 250 | 250 | 250 | 250 | 250 | 250 | 250 | 250 | 250 | 250 | 250 |
| | Toe-in | % | 2 | 2 | 2 | 2 | 2 | 2 | 2 | 2 | 2 | 2 | 2 | 2 |
| Film formability | Stretchability | — | A | A | A | A | A | A | A | A | ○○ | B | △ | XX |
| | Windability Wound configuration | — | ○○ | ○○ | ○○ | ○○ | ○○ | ○○ | ○○ | ○○ | ○○ | ○○ | A | B |
| | Edge misalignment | — | ○ | ○ | ○ | ○ | ○ | ○ | ○ | ○ | ○ | ○ | ○ | ○ |
| Film characteristics | Film thickness | μm | 3 | 3 | 3 | 3 | 3 | 3 | 3 | 3 | 3 | 3 | 3 | 3 |
| | Peak temperature of loss modulus (E″) | ° C. | 140 | 138 | 138 | 139 | 139 | 141 | 136 | 136 | 131 | 146 | 111 | 150 |
| | Dielectric loss tangent (tan δ) at 120° C. | — | 0.0007 | 0.0007 | 0.0007 | 0.0007 | 0.0007 | 0.0007 | 0.0007 | 0.0007 | 0.0011 | 0.0006 | 0.0018 | 0.0005 |
| | Storage modulus (E′) at 120° C. | MPa | 2100 | 2000 | 2030 | 2050 | 2100 | 2250 | 2100 | 2000 | 1600 | 2200 | 500 | 2250 |
| | Storage modulus (E′) at 150° C. | MPa | 480 | 400 | 420 | 450 | 470 | 500 | 300 | 350 | 405 | 490 | 60 | 495 |
| | Shearing force after heat pressing | g | 61 | 95 | 79 | 75 | 65 | 62 | Un-measurable | 200 | 69 | 60 | Un-measurable | 59 |
| | Centerline average surface roughness (Ra) | nm | 60 | 100 | 85 | 87 | 65 | 57 | 110 | 120 | 61 | 59 | 62 | 59 |
| | Plane orientation coefficient | — | −0.034 | −0.029 | −0.031 | −0.032 | −0.033 | −0.036 | −0.02 | −0.025 | −0.038 | −0.03 | −0.055 | −0.029 |
| | ΔN | — | 0.009 | 0.013 | 0.013 | 0.018 | 0.014 | 0.01 | 0.018 | 0.017 | 0.013 | 0.004 | 0.031 | 0.001 |
| | Refractive index in thickness direction (nZ) | — | 1.605 | 1.606 | 1.606 | 1.606 | 1.604 | 1.607 | 1.602 | 1.602 | 1.608 | 1.602 | 1.623 | 1.601 |
| | Average thermal shrinkage rate 23° C. | % | 4.9 | 4.05 | 4.9 | 5 | 4.8 | 5.1 | 2.35 | 2.75 | 4.05 | 5.3 | 2.3 | 5.45 |
| | Breakdown voltage (BDV) 120° C. | V/μm | 570 | 570 | 560 | 550 | 550 | 575 | 470 | 570 | 515 | 590 | 350 | 595 |
| | | V/μm | 460 | 460 | 460 | 450 | 460 | 465 | 390 | 420 | 410 | 475 | 295 | 480 |

TABLE 2-continued

| | | | Example 9 | Example 10 | Example 11 | Example 12 | Example 13 | Example 14 | Example 15 | Example 16 | Example 17 |
|---|---|---|---|---|---|---|---|---|---|---|---|
| Thermoplastic amorphous resin Y | Type | — | PC | PPE | PPE | PPE | PPE | PPE | PPE | PPE | PPE |
| | Glass transition temperature Tg | °C. | 145 | 210 | 210 | 210 | 210 | 210 | 210 | 210 | 210 |
| | Content | Mass % | 30 | 30 | 30 | 30 | 30 | 30 | 30 | 30 | 30 |
| Antioxidant | Type | — | C1 | C1 | C1 | C2 | C1 | C1 | C1 | C1 | C1 |
| | Melting point | °C. | 120 | 120 | 120 | 52 | 120 | 120 | 120 | 120 | 120 |
| | Thermal decomposition temperature | °C. | 335 | 335 | 335 | 230 | 335 | 335 | 335 | 335 | 335 |
| | Content | Mass % | 2 | 1 | 3 | 2 | 2 | 2 | 2 | 2 | 2 |
| Content ratio of polymer Y and antioxidant (polymer Y content/antioxidant content) | | — | 15 | 30 | 10 | 15 | 15 | 15 | 15 | 15 | 15 |
| Coating layer | Water contact angle of coating layer surface | ° | 98 | 98 | 98 | 98 | 78 | 90 | 86 | 74 | 105 |
| | Coating liquid | — | Coating liquid 1 | Coating liquid 1 | Coating liquid 1 | Coating liquid 1 | — | Coating liquid 2 | Coating liquid 3 | Coating liquid 4 | Coating liquid 5 |
| | Coating thickness | nm | 40 | 40 | 40 | 40 | — | 40 | 40 | 40 | 40 |
| Film formation condition | Longitudinal stretching | Draw ratio | 3.2 | 3.5 | 3.5 | 3.5 | 3.5 | 3.5 | 3.5 | 3.5 | 3.5 |
| | | Temperature | 140 | 140 | 140 | 140 | 140 | 140 | 140 | 140 | 140 |
| | Lateral stretching | Draw ratio | 4.0 | 4.2 | 4.2 | 4.2 | 4.2 | 4.2 | 4.2 | 4.2 | 4.2 |
| | | First stage temperature | 126 | 126 | 126 | 126 | 126 | 126 | 126 | 126 | 126 |
| | | Final temperature | 145 | 145 | 145 | 145 | 145 | 145 | 145 | 145 | 145 |
| | Heat treatment | Temperature | 250 | 250 | 250 | 250 | 250 | 250 | 250 | 250 | 250 |
| | | Toe-in | 2 | 2 | 2 | 2 | 2 | 2 | 2 | 2 | 2 |
| Film formability | Stretchability | — | ○ | ○ | ○ | ○ | ○ | ○ | ○ | ○ | ○ |
| | Windability | Wound configuration | A | A | A | A | A | A | A | A | A |
| | | Edge misalignment | ○ | ○ | ○ | ○ | ○ | ○ | ○ | ○ | ○ |
| Film characteristics | Film thickness | μm | 3 | 3 | 3 | 3 | 3 | 3 | 3 | 3 | 3 |
| | Peak temperature of loss modulus (E″) | °C. | 121 | 140 | 140 | 140 | 140 | 140 | 140 | 140 | 140 |
| | Dielectric loss tangent (tanδ) at 120° C. | — | 0.0013 | 0.0007 | 0.0007 | 0.0007 | 0.0007 | 0.0007 | 0.0007 | 0.0007 | 0.0007 |
| | Storage modulus (E′) at 120° C. | MPa | 1400 | 2100 | 2100 | 2100 | 2200 | 2100 | 2100 | 2100 | 2100 |
| | Storage modulus (E′) at 150° C. | MPa | 410 | 480 | 480 | 480 | 490 | 480 | 480 | 480 | 480 |
| | Shearing force after heat pressing | g | 67 | 61 | 61 | 61 | 65 | 61 | 61 | 61 | 61 |
| | Centerline average surface roughness (Ra) | nm | 61 | 60 | 60 | 60 | 55 | 60 | 60 | 60 | 60 |
| | Plane orientation coefficient | — | −0.034 | −0.034 | −0.034 | −0.034 | −0.034 | −0.034 | −0.034 | −0.034 | −0.034 |
| | ΔN | — | 0.009 | 0.009 | 0.009 | 0.009 | 0.009 | 0.009 | 0.009 | 0.009 | 0.009 |
| | Refractive index in thickness direction (nZ) | — | 1.605 | 1.605 | 1.605 | 1.605 | 1.605 | 1.605 | 1.605 | 1.605 | 1.605 |
| | Average thermal shrinkage rate 120° C. | % | 4.9 | 4.9 | 4.9 | 4.9 | 4.15 | 4.9 | 4.9 | 4.9 | 4.9 |
| | Breakdown 23° C. | V/μm | 490 | 570 | 570 | 570 | 530 | 564 | 559 | 553 | 580 |
| | voltage (BDV) 120° C. | V/μm | 410 | 460 | 460 | 460 | 420 | 455 | 451 | 445 | 475 |

In this regard, PPE, PC, C1 and C2 in Table 2 are as follows.

PPE: poly(2,6-dimethyl-1,4-phenylene)ether (the intrinsic viscosity measured in chloroform is 0.32 dl/g and the glass transition temperature is 210° C.)

PC: bisphenol A type polycarbonate (IDEMITSU POLYCARBONATE A300, a bisphenol A type polycarbonate, manufactured by Idemitsu Petrochemical Co., Ltd., the glass transition temperature is 145° C.)

C1: pentaerythritol tetrakis[3-(3,5-di-t-butyl-4-hydroxyphenyl)propionate] (manufactured by Ciba Specialty Chemicals Inc.: product name IRGANOX1010, an antioxidant, melting point 120° C., thermal decomposition temperature 335° C.)

C3: octadecyl-3-(3,5-di-t-butyl-4-hydroxyphenyl)propionate (manufactured by Ciba Specialty Chemicals Inc.: product name IRGANOX1076, an antioxidant, melting point 52° C., thermal decomposition temperature 230° C.)

Production of Capacitor

Using the highly insulating films obtained, capacitors were produced as follows.

First, aluminum was vacuum-vapor-deposited on one side of a highly insulating film (the surface of the coating layer) with a thickness of 500 Å. At this point, the deposition was conducted in a stripe state in the longitudinal direction, in which the vapor-deposited parts with a width of 8 mm and the non-vapor-deposited parts with a width of 1 mm repeat. The vapor-deposited film obtained was slit at the center part in the width directions of the vapor-deposited parts and the non-vapor-deposited parts, and it was wound to form a reel in a tape form with a width of 4.5 mm, which consists of the vapor-deposited part with a width of 4 mm and the non-vapor-deposited part with a width of 0.5 mm. Next, two reels were combined and wound, in a state in which the non-vapor-deposited parts were placed to opposite edges, a wound body was obtained, and then it was pressed at 150° C. under 1 MPa for 5 minutes. Metallikon was thermally sprayed at both edge sides of the wound body after pressing to form external electrodes, lead wires were welded to the metallikon and a wound film capacitor was prepared.

The film capacitors using the films obtained in Examples 1 to 17 of this invention were excellent in the heat resistance and withstand voltage characteristics (breakdown voltage (BDV)), and showed excellent properties as capacitors.

Next, the second invention is described further in detail by Reference Examples and Comparative Reference Examples. Further, each characteristic value in examples was measured and evaluated in the following method. In this regard, the surface roughness of the film, the thermal shrinkage rate, the refractive index, the breakdown voltage (BDV), the thermal decomposition temperature, the glass transition temperature and the melting point, the storage modulus (E'), the loss modulus (E"), the dielectric loss tangent (tan δ), the water contact angle, the film thickness and the thickness variation, and the weight-average molecular weight of the syndiotactic polystyrene were measured in the methods described above.

(1) Average Particle Diameter and Particle Diameter Ratio of Particles (1-1) Average Particle Diameter and Particle Diameter Ratio of Powder A powder was scattered on a sample table so that the particles did not overlap each other, and a gold thin film vapor-deposited layer was formed on the surface thereof with a thickness of 200 to 300 Å using a gold-sputtering apparatus. Next, the particles were observed using a scanning electron microscope at a magnification of 10,000 to 30,000, and using Luzex 500 manufactured by Nippon Regulator, the area-equivalent particle diameter (Di), the long diameter (Dli) and the short diameter (Dsi) were measured for at least 1,000 particles.

(1-2) Average Particle Diameter and Particle Diameter Ratio of Particles in Film A sample film fragment was fixed on a sample table for a scanning electron microscope, and an ion etching treatment was conducted for 10 minutes under vacuum at 0.13 Pa and under a condition of 0.25 kV and 1.25 mA, on the film surface using a sputtering device manufactured by JEOL Ltd. (JIS-1100 type ion sputtering device). Further, gold sputtering was conducted with the same device; the particles were observed using a scanning electron microscope at a magnification of 10,000 to 30,000; and, using Luzex 500 manufactured by Nippon Regulator, the area-equivalent particle diameter (Di), the long diameter (Dli) and the short diameter (Dsi) were measured for at least 1,000 particles.

The values, which were obtained in the above item (1-1) for the average particle diameter and the particle diameter ratio of the powder and in the above item (1-2) for the average particle diameter and the particle diameter ratio of the particles in the film, were used for the following equation, the number of the particles was set as n, and the number average value of the area-equivalent particle diameter (Di) was set as the average particle diameter (D).

$$D = \left(\sum_{i=1}^{n} Di\right) / n \quad \text{[Equation 3]}$$

Further, from the average value of the long diameters (Dl) and the average value of the short diameters (Ds) obtained from the following equations, the particle diameter ratio was calculated by Di/Ds.

$$Dl = \left(\sum_{i=1}^{n} Dli\right) / n \quad \text{[Equation 4]}$$

$$Ds = \left(\sum_{i=1}^{n} Dsi\right) / n \quad \text{[Equation 5]}$$

(2) Relative Standard Deviation of Particle Diameters of Particles

By the following equation, the relative standard deviation of the powder was calculated from the area-equivalent particle diameters (Di) and the average particle diameters (D) of the particles that were calculated in the above item (1-1), and the relative standard deviation of the particles in the film was calculated from the area-equivalent particle diameters (Di) and the average particle diameters (D) of the particles that were calculated in the above item (1-2).

$$\text{Relative Standard Deviation} = \frac{\sqrt{\sum_{i=1}^{n} (Di - D)^2 / n}}{D} \quad \text{[Equation 6]}$$

(3) Stretchability

The stretchability was judged as follows, by the number of the breakages occurring during the film formation of a 100,000 m biaxially stretched film.

Stretchability ◯◯: Less than one breakage per 100,000 m film formation

Stretchability ◯: One to less than two breakages per 100,000 m film formation

Stretchability Δ: Two to less than four breakages per 100,000 m film formation

Stretchability X: Four to less than eight breakages per 100,000 m film formation Stretchability XX: Eight or more breakages per 100,000 m film formation (4) Windability The film was wound in a 9,000 m roll form with a width of 500 mm with a rate of 140 m/minute during the film formation process, and the wound configuration of the roll obtained and the edge misalignment at the roll edges were ranked as follows.

[Wound Configuration]

A: There is no pimple on the roll surface, and the wound configuration is excellent.

B: There are one or more to less than four pimples on the roll surface (projecting embossments), and the wound configuration is almost excellent.

C: There are four or more to less than ten pimples on the roll surface (projecting embossments), and it can be used as a product although the wound configuration is slightly poor.

D: There are ten or more pimples on the roll surface (projecting embossments), the wound configuration is poor and it cannot be used as a product.

[Edge Misalignment]

◯◯: The edge misalignment at the roll edges is less than 0.5 mm, and it is excellent.

◯: The edge misalignment at the roll edges is 0.5 mm or more to less than 1 mm and it is almost excellent.

Δ: The edge misalignment at the roll edges is 1 mm or more to less than 2 mm, and it is slightly poor but can be used as a product.

X: The edge misalignment at the roll edges is 2 mm or more, and it is poor and cannot be used as a product.

XX: The edge misalignment becomes large during the roll winding and a 9,000 m roll cannot be formed.

(5) Pore Volume

The pore volume was measured with a nitrogen adsorption method and calculated by BET equation.

Comparative Reference Example 1

A resin composition was obtained by incorporating: 99.5 parts by mass of polystyrene, which has a weight-average molecular weight of $3.0 \times 10^5$ and in which a nearly perfect syndiotactic structure is observed by $^{13}$C-NMR measurement; 0.4 parts by mass (corresponding to 0.4% by mass in 100% by mass of the biaxially stretched film obtained) of spherical silica particles having an average particle diameter of 0.3 μm, a relative standard deviation of 0.16 and a particle diameter ratio of 1.09 as the inert fine particle A; and 0.1 parts by mass (corresponding to 0.1% by mass in 100% by mass of the biaxially stretched film obtained) of spherical silicone resin particles having an average particle diameter of 1.2 μm, a relative standard deviation of 0.15 and a particle diameter ratio of 1.10 as the inert fine particle B.

The resin composition obtained was dried at 120° C. for 7 hours, supplied into an extruder, melted at 300° C., extruded through a die slit, and then cooled and solidified on a casting drum cooled at 50° C.; and an unstretched sheet was prepared.

This unstretched sheet was stretched to 3.2 times at 115° C. in the longitudinal direction (the machine axis direction); the film was then guided to a tenter; preheating was conducted for 6 seconds in the process in which the temperature at the beginning of the preheating was 95° C. and the temperature at the end of the preheating (the temperature at the beginning of the stretching) was 103° C.; and then the film was stretched to 3.5 times in the lateral direction (the direction perpendicular to the machine axis direction and the thickness direction). At this point, the stretching rate in the lateral direction was 5,000%/minute. Further, regarding the temperature for stretching in the lateral direction, the temperature of the first stage was 103° C. and the temperature of the final stage was 121° C. Then, the heat set was conducted at 240° C. for 9 seconds, the 5% relaxation treatment was conducted in the lateral direction while the film was cooled to 180° C., and a biaxially stretched film having a thickness of 3.0 μm was obtained and wound in a roll. The characteristics of the film obtained are shown in Table 3.

Reference Example 1

The unstretched sheet formed in Comparative Example 1 was stretched to 3.2 times at 115° C. in the longitudinal direction (the machine axis direction); then the coating liquid 1 (a 5% by mass water dispersible coating liquid) including the components described in Table 1 was coated on one side of the longitudinally stretched film so that the thickness of the finally obtained coating layer became 40 nm; the film was then guided to a tenter; preheating was conducted while the coating liquid was dried for 6 seconds in the process in which the temperature at the beginning of the preheating was 95° C. and the temperature at the end of the preheating (the temperature at the beginning of the stretching) was 103; and then the film was stretched to 3.5 times in the lateral direction (the direction perpendicular to the machine axis direction and the thickness direction). At this point, the stretching rate in the lateral direction was 5,000%/minute. Further, regarding the temperature for stretching in the lateral direction, the temperature of the first stage was 103° C. and the temperature of the final stage was 121° C. Then, the heat set was conducted at 240° C. for 9 seconds, the 5% relaxation treatment was conducted in the lateral direction while the film was cooled to 180° C., and a biaxially stretched film having a thickness of 3.0 μm was obtained and wound in a roll. The characteristics of the film obtained are shown in Tables 3 and 4.

Reference Examples 2, 3 and 4 and Comparative Reference Example 2

A similar operation to that in Reference Example 1 was repeated, except that the coating liquid 1 was changed to the coating liquid 2, 3, 4 or 5 shown in Table 1, as described in Table 2. The characteristics of the films obtained are shown in Table 3.

TABLE 3

|  |  | Unit | Comparative Reference Example 1 | Reference Example 1 | Reference Example 2 | Reference Example 3 | Comparative Reference Example 2 | Reference Example 4 |
|---|---|---|---|---|---|---|---|---|
| Coating layer | Coating liquid | — | None | Coating liquid 1 | Coating liquid 2 | Coating liquid 3 | Coating liquid 4 | Coating liquid 5 |
|  | Coating thickness | nm | — | 40 | 40 | 40 | 40 | 40 |
| Film Characteristics | Centerline average surface roughness (Ra) | nm | 21 | 21 | 21 | 21 | 21 | 21 |
|  | Refractive index in thickness direction (nZ) | — | 1.623 | 1.623 | 1.623 | 1.623 | 1.623 | 1.623 |
|  | 200° C. 10 minutes Thermal Shrinkage Rate — Longitudinal direction | % | 3.0 | 3.0 | 3.0 | 3.0 | 3.0 | 3.0 |
|  | Lateral direction | % | 1.4 | 1.4 | 1.4 | 1.4 | 1.4 | 1.4 |
|  | Breakdown voltage (BDV) 23° C. | V/μm | 335 | 380 | 371 | 363 | 343 | 380 |
|  | 120° C. | V/μm | 285 | 320 | 313 | 307 | 298 | 320 |
|  | Water contact angle of coating layer surface | Degree | 78 | 98 | 90 | 86 | 74 | 105 |

Regarding the films obtained in Table 3, the peak temperatures of the loss modulus (E″) were 111° C., the dielectric loss tangents (tan δ) at 120° C. were 0.0018 and the storage moduli (E') at 120° C. were 500 MPa. Further, regarding all the films in Table 3, the stretchability was ○○, the wound configuration of the windability was A and the edge misalignment was ○○.

Reference Examples 5 to 8, 11 and 12 and Comparative Reference Example 3

A similar operation to that in Reference Example 1 was repeated, except that the 99.5 parts by mass of polystyrene was changed to a mixture of polystyrene, the polymer Y and the antioxidant as shown in Table 4, the condition for the film formation was changed as shown in Table 3 and the extrusion amount and the coating amount were adjusted so that the thicknesses of the film and the coating layer obtained became 3 μm and 40 nm, respectively. The characteristics of the films obtained are shown in Table 3. In this regard, regarding Reference Example 8, the characteristics of the film obtained are also shown in Table 5.

Reference Examples 9, 10 and 13

A similar operation to that in Reference Example 8 was repeated, except that the coating liquid 1 was changed to the coating liquid 2 or 3 shown in Table 1, as respectively shown in Table 4. The characteristics of the films obtained are shown in Table 4.

TABLE 4

| | | Unit | Reference Example 1 | Reference Example 5 | Reference Example 6 | Reference Example 7 | Reference Example 8 | Reference Example 9 |
|---|---|---|---|---|---|---|---|---|
| SPS | Content | Mass % | 99.5 | 97.5 | 97.5 | 77.5 | 67.5 | 67.5 |
| Inert particle | Particle A Content | Mass % | 0.4 | 0.4 | 0.4 | 0.4 | 0.4 | 0.4 |
| | Particle B Content | Mass % | 0.1 | 0.1 | 0.1 | 0.1 | 0.1 | 0.1 |
| Polymer Y | Type | — | None | None | None | PPE | PPE | PPE |
| | Glass transition temperature Tg | °C | — | — | — | 210 | 210 | 210 |
| | Content | Mass % | — | — | — | 20 | 30 | 30 |
| Antioxidant | Type | — | None | C1 | C3 | C1 | C1 | C1 |
| | Melting point | °C | — | 120 | 52 | 120 | 120 | 120 |
| | Thermal decomposition temperature | °C | — | 335 | 230 | 335 | 335 | 335 |
| | Content | Mass % | None | 2.0 | 2.0 | 2.0 | 2.0 | 2.0 |
| Content ratio of polymer Y and antioxidant (polymer Y content/antioxidant content) | | — | — | 0.0 | 0.0 | 10.0 | 15.0 | 15.0 |
| Coating layer | Coating liquid | — | Coating liquid 1 | Coating liquid 1 | Coating liquid 1 | Coating liquid 1 | Coating liquid 1 | Coating liquid 2 |
| | Coating thickness | nm | 40 | 40 | 40 | 40 | 40 | 40 |
| Film formation condition | Longitudinal draw ratio | Time | 3.2 | 3.2 | 3.2 | 3.2 | 3.2 | 3.2 |
| | Longitudinal stretching temperature | °C | 115 | 115 | 115 | 129 | 138 | 138 |
| | Lateral preheating temperature First stage | °C | 95 | 95 | 95 | 95 | 95 | 95 |
| | Final stage | °C | 103 | 103 | 103 | 105 | 107 | 107 |
| | Average temperature for drying coating liquid | °C | 99 | 99 | 103 | 105 | 107 | 107 |
| | Lateral preheating temperature Lateral draw ratio | Time | 3.5 | 3.5 | 3.5 | 3.5 | 3.5 | 3.5 |
| | Lateral stretching temperature First stage | °C | 103 | 103 | 103 | 105 | 107 | 107 |
| | Final stage | °C | 121 | 121 | 121 | 133 | 139 | 139 |
| Film characteristics | Windability Wound configuration | — | A | A | A | A | A | A |
| | Edge Misalignment | — | ○ | ○ | ○ | ○ | ○ | ○ |
| | Stretchability | — | ○ | ○ | ○ | ○ | ○ | ○ |
| | Film thickness | μm | 3.0 | 3.0 | 3.0 | 3.0 | 3.0 | 3.0 |
| | Peak temperature of loss modulus (E") | °C | 111 | 111 | 111 | 129 | 137 | 137 |
| | Dielectric loss tangent (tanδ) at 120° C. | — | 0.0018 | 0.0018 | 0.0018 | 0.0013 | 0.0011 | 0.0011 |
| | Storage modulus (E') at 120° C. | MPa | 500 | 500 | 500 | 1050 | 1450 | 1450 |
| | Centerline average surface roughness (Ra) | nm | 20 | 20 | 20 | 20 | 20 | 20 |
| | Refractive index in thickness direction (nZ) | — | 1.623 | 1.624 | 1.623 | 1.615 | 1.607 | 1.607 |
| | 200° C. 10 minutes thermal shrinkage rate Longitudinal direction | % | 3.0 | 3.0 | 3.0 | 2.9 | 2.8 | 2.8 |
| | Lateral direction | % | 1.4 | 1.4 | 1.4 | 1.3 | 1.3 | 1.3 |
| | Breakdown voltage (BDV) 23° C. | V/μm | 380 | 440 | 390 | 520 | 530 | 526 |
| | 120° C. | V/μm | 320 | 370 | 325 | 445 | 450 | 447 |
| | Water contact angle of coating layer surface | Degree | 98 | 98 | 98 | 98 | 98 | 98 |

| | | Unit | Reference Example 10 | Reference Example 11 | Comparative Reference Example 3 | Reference Example 12 | Reference Example 13 |
|---|---|---|---|---|---|---|---|
| SPS | Content | Mass % | 67.5 | 57.5 | 47.5 | 67.5 | 67.5 |
| Inert particle | Particle A Content | Mass % | 0.4 | 0.4 | 0.4 | 0.4 | 0.4 |
| | Particle B Content | Mass % | 0.1 | 0.1 | 0.1 | 0.1 | 0.1 |
| Polymer Y | Type | — | PPE | PPE | PPE | PC | PPE |
| | Glass transition temperature Tg | °C | 210 | 210 | 210 | 145 | 210 |
| | Content | Mass % | 30 | 40 | 50 | 30 | 30 |

TABLE 4-continued

| | | | | | | | |
|---|---|---|---|---|---|---|---|
| Antioxidant | Type | | C1 | C1 | C1 | C1 | C1 |
| | Melting point | °C. | 120 | 120 | 120 | 120 | 120 |
| | Thermal decomposition temperature | °C. | 335 | 335 | 335 | 335 | 335 |
| | Content | Mass % | 2.0 | 2.0 | 2.0 | 2.0 | 2.0 |
| Content ratio of polymer Y and antioxidant (polymer Y content/antioxidant content) | | | 15.0 | 20.0 | 25.0 | 15.0 | 15.0 |
| Coating layer | Coating liquid | | Coating liquid 3 | Coating liquid 1 | Coating liquid 1 | Coating liquid 1 | Coating liquid 5 |
| | Coating thickness | nm | 40 | 40 | 40 | 40 | 40 |
| Film formation condition | Longitudinal draw ratio | Time | 3.2 | 3.2 | 3.2 | 2.6 | 3.2 |
| | Longitudinal stretching temperature | °C. | 138 | 147 | 156 | 130 | 138 |
| | Lateral preheating temperature First stage | °C. | 95 | 95 | 95 | 95 | 95 |
| | Final stage | °C. | 107 | 108 | 108 | 106 | 107 |
| | Average temperature for drying coating liquid | °C. | | | | | |
| | Lateral preheating temperature | Time | 3.5 | 3.5 | 3.5 | 3.0 | 3.5 |
| | Lateral draw ratio First stage | °C. | 107 | 108 | 109 | 106 | 107 |
| | Lateral stretching temperature Final stage | °C. | 139 | 146 | 161 | 134 | 139 |
| Film characteristics | Stretchability | | ○○ | ○○ | X | ○ | ○○ |
| | Windability Wound configuration | | A | A | A | A | A |
| | Edge Misalignment | | ○○ | ○○ | ○○ | ○○ | ○○ |
| | Film thickness | μm | 3.0 | 3.0 | 3.0 | 3.0 | 3.0 |
| | Peak temperature of loss modulus (E″) | °C. | 137 | 145 | 153 | 110 | 137 |
| | Dielectric loss tangent (tanδ) at 120° C. | | 0.0011 | 0.0009 | 0.0006 | 0.0015 | 0.0011 |
| | Storage modulus (E′) at 120° C. | MPa | 1450 | 1800 | 2200 | 800 | 1450 |
| | Centerline average surface roughness (Ra) | nm | 20 | 20 | 20 | 20 | 20 |
| | Refractive index in thickness direction (nZ) | | 1.607 | 1.600 | 1.599 | 1.620 | 1.607 |
| | 200° C. 10 minutes thermal shrinkage rate Longitudinal direction | % | 2.8 | 2.8 | 2.7 | 2.3 | 2.8 |
| | Lateral direction | % | 1.3 | 1.2 | 1.2 | 0.4 | 1.3 |
| | Breakdown voltage (BDV) 23° C. | V/μm | 523 | 535 | 540 | 435 | 520 |
| | 120° C. | V/μm | 444 | 455 | 460 | 380 | 445 |
| | Water contact angle of coating layer surface | Degree | 98 | 98 | 98 | 98 | 105 |

In this regard, PPE, PC and C1 in Table 4 are as follows.

PPE: poly(2,6-dimethyl-1,4-phenylene)ether (the intrinsic viscosity measured in chloroform is 0.32 dl/g and the glass transition temperature is 210° C.)

PC: bisphenol A type polycarbonate (IDEMITSU POLYCARBONATE A300, a bisphenol A type polycarbonate, manufactured by Idemitsu Petrochemical Co., Ltd., the glass transition temperature is 145° C.)

C1: pentaerythritoltetrakis[3-(3,5-di-t-butyl-4-hydroxyphenyl)propionate] (manufactured by Ciba Specialty Chemicals Inc.: product name IRGANOX1010, an antioxidant, melting point 120° C., thermal decomposition temperature 335° C.)

C3: octadecyl-3-(3,5-di-t-butyl-4-hydroxyphenyl)propionate (manufactured by Ciba Specialty Chemicals Inc.: product name IRGANOX1076, an antioxidant, melting point 52° C., thermal decomposition temperature 230° C.)

Reference Examples 14 to 24

A similar operation to that in Reference Example 8 was repeated except that the types and the contents of the inert particles A and B were changed as shown in Table 4. The characteristics of the films obtained are shown in Table 5.

TABLE 5

| | | | Unit | Reference Example 7 | Reference Example 14 | Reference Example 15 | Reference Example 16 | Reference Example 17 | Reference Example 18 |
|---|---|---|---|---|---|---|---|---|---|
| SPS | | Content | Mass % | 67.5 | 67.5 | 67.5 | 67.5 | 67.5 | 67.8 |
| Inert fine particle A | | Type | — | Spherical silica particle | Spherical silica particle | Spherical silica particle | Spherical silicone resin particle | Spherical silica particle | Spherical silica particle |
| | In film | Average particle diameter | μm | 0.3 | 0.3 | 0.3 | 1.2 | 0.3 | 0.3 |
| | | Relative standard deviation of particle diameters | — | 0.16 | 0.16 | 0.16 | 0.15 | 0.16 | 0.16 |
| | | Particle diameter ratio | — | 1.09 | 1.09 | 1.09 | 1.10 | 1.09 | 1.09 |
| | | Content | Mass % | 0.4 | 0.3 | 0.1 | 0.5 | 0.5 | 0.2 |
| Inert fine particle B | | Type | — | Spherical silicone resin particle | Spherical silicone resin particle | Spherical silicone resin particle | None | None | None |
| | In film | Average particle diameter | μm | 1.2 | 1.2 | 1.2 | — | — | — |
| | | Relative standard deviation of particle diameters | — | 0.15 | 0.15 | 0.15 | — | — | — |
| | | Particle diameter ratio | — | 1.10 | 1.10 | 1.10 | — | — | — |
| | | Content | Mass % | 0.1 | 0.2 | 0.4 | — | — | — |
| Inert fine particle C | | Type | — | None | None | None | None | None | None |
| | In film | Average secondary particle diameter | μm | — | — | — | — | — | — |
| | | Pore volume | ml/g | — | — | — | — | — | — |
| | | Average primary particle diameter | μm | — | — | — | — | — | — |
| | | Content | Mass % | — | — | — | — | — | — |
| Polymer Y | | Content | Mass % | 30 | 30 | 30 | 30 | 30 | 30 |
| Antioxidant | | Content | Mass % | 2.0 | 2.0 | 2.0 | 2.0 | 2.0 | 2.0 |
| | | Coating liquid | — | Coating liquid 1 | Coating liquid 1 | Coating liquid 1 | Coating liquid 1 | Coating liquid 1 | Coating liquid 1 |
| Film characteristics | | Stretchability | — | ◯◯ | ◯◯ | ◯◯ | ◯◯ | ◯◯ | ◯◯ |
| | Windability | Wound configuration | — | A | A | A | B | B | C |
| | | Edge Misalignment | — | ◯◯ | ◯◯ | ◯ | ◯◯ | ◯ | ◯ |
| | | Film thickness | μm | 3.0 | 3.0 | 3.0 | 3.0 | 3.0 | 3.0 |
| | | Peak temperature of loss modulus (E″) | ° C. | 137 | 137 | 137 | 137 | 137 | 137 |
| | | Dielectric loss tangent (tan δ) at 120° C. | — | 0.0011 | 0.0011 | 0.0011 | 0.0011 | 0.0011 | 0.0011 |
| | | Storage modulus (E′) at 120° C. | MPa | 1400 | 1400 | 1400 | 1400 | 1400 | 1400 |
| | | Centerline average surface roughness (Ra) | nm | 19 | 24 | 28 | 29 | 13 | 9 |
| | | Refractive index in thickness direction (nZ) | — | 1.607 | 1.607 | 1.607 | 1.607 | 1.607 | 1.607 |
| | 200° C. 10 minutes thermal shrinkage rate | Longitudinal direction | % | 2.8 | 2.8 | 2.8 | 2.8 | 2.8 | 2.8 |
| | | Lateral direction | % | 1.3 | 1.3 | 1.3 | 1.3 | 1.3 | 1.3 |
| | Breakdown voltage (BDV) | 23° C. | V/μm | 530 | 530 | 530 | 530 | 530 | 530 |
| | | 120° C. | V/μm | 450 | 450 | 450 | 450 | 450 | 450 |
| | | Water contact angle of coating layer surface | Degree | 98 | 98 | 98 | 98 | 98 | 98 |

| | | | Unit | Reference Example 19 | Reference Example 20 | Reference Example 21 | Reference Example 22 | Reference Example 23 | Reference Example 24 |
|---|---|---|---|---|---|---|---|---|---|
| SPS | | Content | Mass % | 67.5 | 67.5 | 67.5 | 67.5 | 67.5 | 67.8 |
| Inert fine particle A | | Type | — | None | None | Spherical silicone resin particle | Spherical silicone resin particle | Spherical silicone resin particle | Spherical silicone resin particle |
| | In film | Average particle diameter | μm | — | — | 0.3 | 0.3 | 0.7 | 0.7 |
| | | Relative standard deviation of particle diameters | — | — | — | 0.17 | 0.17 | 0.15 | 0.15 |
| | | Particle diameter ratio | — | — | — | 1.10 | 1.10 | 1.10 | 1.10 |
| | | Content | Mass % | — | — | 0.4 | 0.3 | 0.5 | 0.2 |

TABLE 5-continued

| | | | | | | | | | |
|---|---|---|---|---|---|---|---|---|---|
| Inert fine particle B | | Type | — | None | None | Spherical silicone resin particle | Spherical silicone resin particle | — | — |
| | In film | Average particle diameter | μm | — | — | 0.7 | 0.7 | — | — |
| | | Relative standard deviation of particle diameters | — | — | — | 0.15 | 0.15 | — | — |
| | | Particle diameter ratio | — | — | — | 1.10 | 1.10 | — | — |
| | | Content | Mass % | — | — | 0.1 | 0.2 | — | — |
| Inert fine particle C | | Type | — | Porous silica | Porous silica | Spherical silicone resin particle | Spherical silicone resin particle | — | — |
| | In film | Average secondary particle diameter | μm | 2.3 | 1.5 | 0.7 | 0.7 | — | — |
| | | Pore volume | ml/g | 0.4 | 1.6 | 0.15 | 0.15 | — | — |
| | | Average primary particle diameter | μm | 0.1 | 0.02 | 1.10 | 1.10 | — | — |
| | | Content | Mass % | 0.2 | 0.2 | 0.1 | 0.2 | — | — |
| Polymer Y | | Content | Mass % | 30 | 30 | 30 | 30 | 30 | 30 |
| Antioxidant | | Content | Mass % | 2.0 | 2.0 | 2.0 | 2.0 | 2.0 | 2.0 |
| | | Coating liquid | — | Coating liquid 1 | Coating liquid 1 | Coating liquid 1 | Coating liquid 1 | Coating liquid 1 | Coating liquid 1 |
| Film characteristics | | Stretchabiliy | — | ○○ | ○○ | ○○ | ○○ | ○○ | ○○ |
| | Windability | Wound configuration | — | A | C | A | A | A | B |
| | | Edge Misalignment | — | ○○ | ○○ | ○○ | ○ | ○ | ○ |
| | | Film thickness | μm | 3.0 | 3.0 | 3.0 | 3.0 | 3.0 | 3.0 |
| | | Peak temperature of loss modulus (E″) | ° C. | 137 | 137 | 137 | 137 | 137 | 137 |
| | | Dielectric loss tangent (tanδ) at 120° C. | — | 0.0011 | 0.0011 | 0.0011 | 0.0011 | 0.0011 | 0.0011 |
| | | Storage modulus (E′) at 120° C. | MPa | 1400 | 1400 | 1400 | 1400 | 1400 | 1400 |
| | | Centerline average surface roughness (Ra) | nm | 80 | 10 | 17 | 20 | 25 | 18 |
| | | Refractive index in thickness direction (nZ) | — | 1.607 | 1.607 | 1.607 | 1.607 | 1.607 | 1.607 |
| | 200° C. 10 minutes thermal shrinkage rate | Longitudinal direction | % | 2.8 | 2.8 | 2.8 | 2.8 | 2.8 | 2.8 |
| | | Lateral direction | % | 1.3 | 1.3 | 1.3 | 1.3 | 1.3 | 1.3 |
| | Breakdown voltage (BDV) | 23° C. | V/μm | 520 | 550 | 530 | 530 | 530 | 530 |
| | | 120° C. | V/μm | 440 | 460 | 450 | 450 | 450 | 450 |
| | | Water contact angle of coating layer surface | Degree | 98 | 98 | 98 | 98 | 98 | 98 |

In Table 5, the polymer Y is PPE in Table 4 and the antioxidant is C1 in Table 4.

Reference Examples 25 and 26

A similar operation to that in Reference Example 8 was repeated, except that the condition for the film formation was changed as shown in Table 5 and the extrusion amount and the coating amount were adjusted so that the thicknesses of the film and the coating layer obtained became 3 μm and 40 μm, respectively. The characteristics of the films obtained are shown in Table 6.

TABLE 6

| | | | Unit | Reference Example 7 | Reference Example 25 | Reference Example 26 |
|---|---|---|---|---|---|---|
| | | Coating liquid | — | Coating liquid 1 | Coating liquid 1 | Coating liquid 1 |
| Film formation condition | | Longitudinal draw ratio | Time | 3.2 | 3.7 | 4.2 |
| | | Longitudinal stretching temperature | ° C. | 138 | 140 | 141 |
| | | Lateral draw ratio | Time | 3.5 | 3.9 | 4.4 |
| | Lateral preheating temperature | First stage | ° C. | 95 | 95 | 95 |
| | | Final stage | ° C. | 107 | 108 | 109 |
| | Lateral stretching temperature | First stage | ° C. | 107 | 108 | 109 |
| | | Final stage | ° C. | 139 | 142 | 145 |
| Film characteristics | | Stretchability | — | ○○ | ○ | Δ |
| | Windability | Wound configuration | — | A | B | C |
| | | Edge misalignment | — | ○○ | ○ | Δ |
| | | Film thickness | μm | 3.0 | 3.0 | 3.0 |
| | | Peak temperature of loss modulus (E″) | ° C. | 137 | 136 | 136 |
| | | Dielectric loss tangent (tanδ) at 120° C. | — | 0.0011 | 0.0010 | 0.0010 |
| | | Storage modulus (E′) at 120° C. | MPa | 1400 | 1400 | 1400 |
| | | Centerline average surface roughness (Ra) | nm | 19 | 19 | 18 |
| | | Refractive index in thickness direction (nZ) | — | 1.607 | 1.618 | 1.629 |
| | 200° C. 10 minutes thermal shrinkage rate | Longitudinal direction | % | 2.8 | 3.0 | 3.2 |
| | | Lateral direction | % | 1.3 | 1.4 | 1.4 |
| | Breakdown voltage (BDV) | 23° C. | V/μm | 530 | 540 | 545 |
| | | 120° C. | V/μm | 450 | 460 | 470 |
| | | Water contact angle of coating layer surface | Degree | 98 | 98 | 98 |

Production of Capacitor

Further, using the highly insulating films obtained in Reference Examples and Comparative Reference Examples, capacitors were produced by the method described above.

The film capacitors using the films obtained in Reference Examples 1 to 26 of the second invention were excellent in the heat resistance and withstand voltage characteristics (breakdown voltage (BDV)), and showed excellent properties as capacitors. In particular, Reference Examples 1 to 14, 19 and 21 were excellent in the processability during the capacitor production. In addition, the film capacitors using the films of Reference Examples 7 to 11 and 13 to 26 were especially excellent in the withstand voltage characteristics, and showed excellent properties as capacitors.

INDUSTRIAL APPLICABILITY

The highly insulating film of this invention can be suitably used as an insulator for a capacitor. In particular, it can be suitably used as an insulator for a capacitor, which is installed in a hybrid car or the like and exposed to a relatively high temperature condition.

The invention claimed is:

1. A highly insulating film, which is characterized by comprising a biaxially stretched film containing a styrene polymer having a syndiotactic structure as a main component, containing a thermoplastic amorphous resin Y having a glass transition temperature Tg by DSC of 130° C. or higher in an amount of 5% by mass or more and 48% by mass or less, and having a plane orientation coefficient (AP) represented by the following equation (1) of −0.027 or less and −0.040 or more:

$$\Delta P = (Nx + Ny)/2 - Nz \qquad (1)$$

(in the equation (1), Nx represents the minimum value of the refractive index in the plane direction of the film, Ny represents the refractive index in the direction perpendicular to Nx in the plane direction of the film, and Nz represents the refractive index in the thickness direction of the film), wherein the polymer Y is polyphenylene ether represented by the following formula (A),

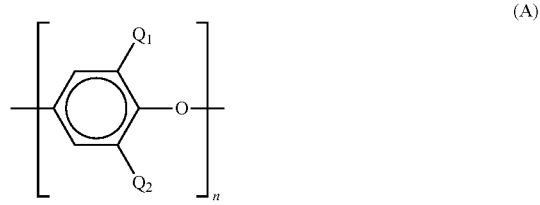

(each of $Q_1$ and $Q_2$ in the above formula (A) is at least one kind selected from the group consisting of methyl, ethyl and propyl), wherein the film contains an antioxidant in an amount of 0.1% by mass or more and 8% by mass or less relative to the mass of the biaxially stretched film, wherein the content ratio of the polymer Y and the antioxidant (the polymer Y content/the antioxidant content) is 1 to 100, wherein a refractive index in thickness direction of the biaxially stretched film is 1.600 or more and 1.610 or less, and wherein the highly insulating film has a breakdown voltage at 120° C. of 400 V/μm or more.

2. The highly insulating film described in claim 1, wherein the thermal decomposition temperature of the antioxidant is 250° C. or higher.

3. The highly insulating film described in claim 1, wherein the absolute value of the difference between the minimum value of the refractive index in the plane direction of the film (Nx) and the refractive index in the direction perpendicular to the direction (Ny) is 0.025 or less.

4. The highly insulating film described in claim 1, wherein the biaxially stretched film contains an inert fine particle having an average particle diameter of 0.05 μm or more and 3.0 μm or less in an amount of 0.05% by mass or more and 3% by mass or less relative to the mass of the biaxially stretched film.

5. The highly insulating film described in claim 1, wherein the biaxially stretched film has a coating layer, which is provided on at least one side of the biaxially stretched film and has a water contact angle of the surface of 85° or more and 120° or less.

6. The highly insulating film described in claim 5, wherein the coating layer contains at least one kind selected from the group consisting of a wax component, a silicone component and a fluorine compound in an amount of 41% by mass or more and 94% by mass or less based on the mass of the coating layer.

7. The highly insulating film described in claim 6, wherein the coating layer contains a wax component, and the wax component is polyolefin wax.

8. The highly insulating film described in claim 5, wherein the thickness of the coating layer is in the range of 0.005 to 0.5 μm.

9. The highly insulating film described in claim 1, wherein the thickness of the highly insulating film is 0.4 μm or more and less than 6.5 μm.

* * * * *